(12) United States Patent
Malvar

(10) Patent No.: US 6,771,828 B1
(45) Date of Patent: Aug. 3, 2004

(54) SYSTEM AND METHOD FOR PROGESSIVELY TRANSFORM CODING DIGITAL DATA

(75) Inventor: Henrique S. Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/518,458

(22) Filed: Mar. 3, 2000

(51) Int. Cl.$^7$ .............................. G06F 9/46; H04N 7/12
(52) U.S. Cl. ...................... 382/240; 382/233; 382/248; 375/240.11
(58) Field of Search ................................. 382/232, 233, 382/240, 244, 248, 250, 245, 276; 708/402, 405, 409; 375/240.11

(56) References Cited

U.S. PATENT DOCUMENTS

| | | | |
|---|---|---|---|
| 5,381,145 A | | 1/1995 | Allen et al. |
| 5,602,589 A | | 2/1997 | Vishwanath et al. |
| 6,101,279 A | * | 8/2000 | Nguyen et al. ............. 382/240 |
| 6,263,109 B1 | | 7/2001 | Ordentlich et al. |
| 6,324,560 B1 | * | 11/2001 | Malvar ....................... 708/400 |
| 6,393,156 B1 | * | 5/2002 | Nguyen et al. ............. 382/248 |
| 6,421,464 B1 | * | 7/2002 | Tran et al. .................. 382/232 |

FOREIGN PATENT DOCUMENTS

| | | |
|---|---|---|
| EP | 0940994 | 2/1999 |
| WO | 98/19263 | 5/1998 |
| WO | 98/54903 | 12/1998 |
| WO | 93/17524 | 9/1999 |

OTHER PUBLICATIONS

Chang, S.G. et al., "A simple block–based lossless image compression scheme", *Conf. Record on Thirtieth Asilomar Confers on Signals, Systems and Computers*, Pacific Grove, CA, vol. 1, XP 000925098, 591–595, (1997).

De Queriroz, R., et al., "Wavelet transforms in a jpeg like image coder", *IEEE Transactions on Circuits and Systems for Video Technology*, IEEE Inc, New York, vol. 7, No. 2, XP000687660, 419–424, (Apr. 1997).

Howard, P.G. et al., "Fast progressive lossless image compression =", *Proceedings of the SPIE*, US SPIE. Bellingham, VA, vol. 2186, XP000614258, 981–109, (Feb. 9, 1994).

Langdon, G.G., et al., "A simple general binary source code", *IEEE Transactions on Information Theory*, vol. 28, No. 5 Pt. 1, XP000915490, 800–803, (Sep. 1982).

Ordentlich, E., et al., "A low–complexity modeling approach for embedded coding of wavelet coefficients", *Proceedings DCC '98 Data Compression Conference* (Cat. No. 98TB1002256) Snowbird, UT, XP000925096, 480–417, (1998).

(List continued on next page.)

Primary Examiner—Andrew W. Johns
Assistant Examiner—Duy M. Dang
(74) Attorney, Agent, or Firm—Lyon & Harr, L.L.P.; Craig S. Fischer

(57) ABSTRACT

The present invention is embodied in a system and method for compressing image data using a lapped biorthogonal transform (LBT). The present invention encodes data by generating coefficients using a hierarchical LBT, reorders the coefficients in a data-independent manner into groups of similar data, and encodes the reordered coefficients using adaptive run-length encoding. The hierarchical LBT computes multiresolution representations. The use of the LBT allows the present invention to encode image data in a single pass at any desired compression ratio and to make use of existing discrete cosine transform (DCT) software and hardware modules for fast processing and easy implementation.

34 Claims, 15 Drawing Sheets

OTHER PUBLICATIONS

Rossetti, F., et al., "Improved scanning methods for wavelet coefficients of video signals", *Signal Processing, Image Compression NL Elsevier Science Publishers*, vol. 8, No. 4, XP000586007, 365–378, (May 1, 1996).

Co–pending U.S. patent application Ser. No. 09/276,954, "Image Encoding Using Reordering and Blocking of Wavelet Coefficients Combined with Adaptive Encoding," filed Mar. 26, 1999.

Malvar, H.S. "Fast Progressive Image Coding without Wavelets," Proc. IEEE Data Compression Conf., Snowbird, Utah, Mar. 2000, to appear.

Malvar, H.S., "Biorthogonal and nonuniform lapped transform for transform coding with reduced blocking and ringing artifacts," IEEE Trans. Signal Processing, vol. 46, pp. 1043–1053, Apr. 1998.

Malvar, H.S., "Fast Progressive Wavelet Coding", IEEE, pp. 336–343, 1999.

Malvar, H.S., Signal Processing with Lapped Transforms. Boston: Artech House, 1992.

Rao, K.R., and P. Yip, Discrete Cosine Transform: Algorithms, Advantages, and Applications. New York: Academic Press, 1990.

Said, A., et al., "A new, Fast, and Efficient Image Codec Based on Set Partitioning in Hierarchical Trees", IEEE Transactions on Circuits and Systems for Video Technology, 6(3), pp. 243–250, Jun. 1996.

Shapiro, J., "Embedded image coding using zerotrees of wavelet coefficients," IEEE Trans. Signal Processing, vol. 41, pp. 3445–3462, Dec. 1993.

Vetterli, M. and J. Kovacevic, Wavelets and Subband Coding. Englewood Cliffs, MJ: Prentice Hall, 1995.

* cited by examiner

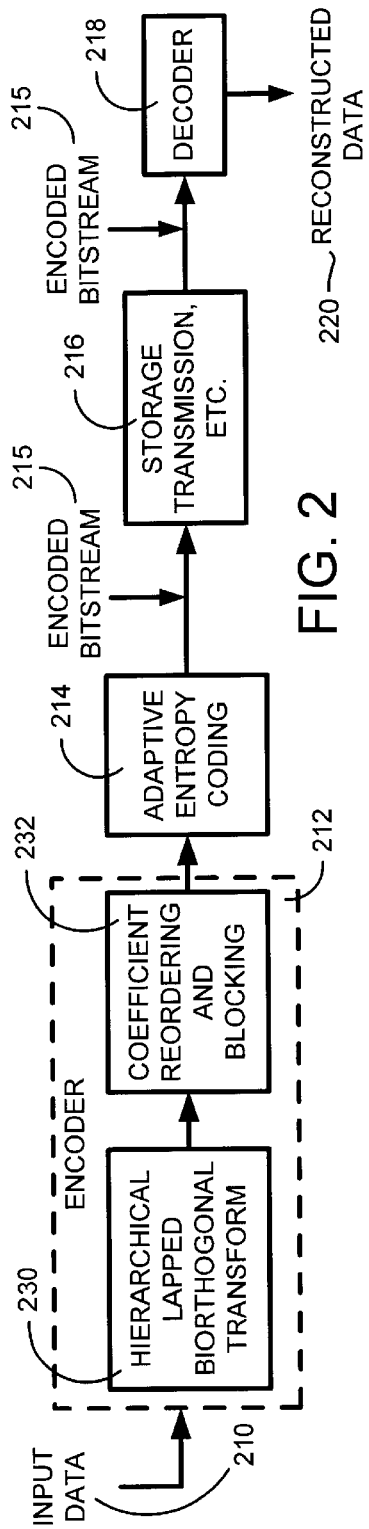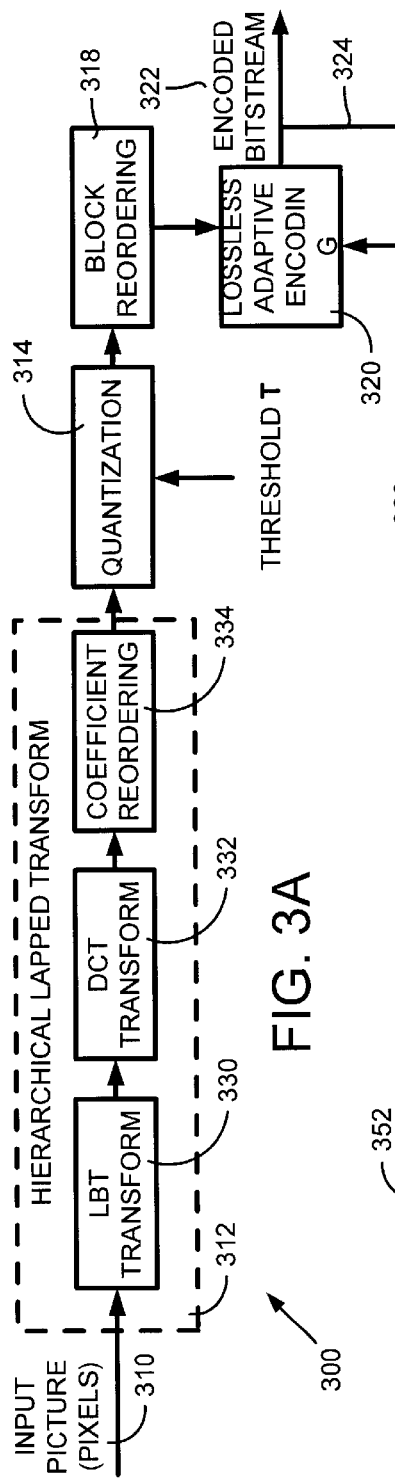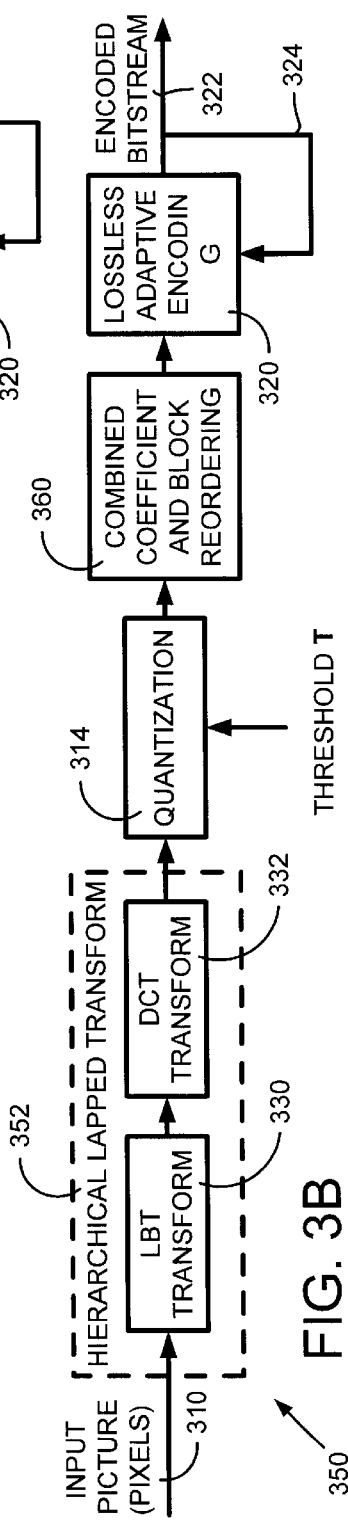

SYSTEM AND METHOD FOR PROGESSIVELY TRANSFORM CODING DIGITAL DATA

BACKGROUND OF THE INVENTION

1. Field of the Invention

The present invention relates in general to processing digital data, and in particular, to a system and method for progressively transform coding image data using hierarchical lapped transforms for compression of the image data.

2. Related Art

Digital images are widely used in several applications such as, for example, imaging software, digital cameras, Web pages and digital encyclopedias. Usually it is necessary to compress the digital images due to storage constraints and the desire to decrease access or download time of the picture. Higher compression of a digital image means that more digital images can be stored on a memory device (such as diskette, hard drive or memory card) and these images can be transferred faster over limited bandwidth transmission lines (such as telephone lines). Thus, efficient and effective compression of images is highly important and desirable.

One of the most popular and widely used techniques of image compression is the Joint Photographic Experts Group (JPEG) standard. The JPEG standard operates by mapping an 8×8 square block of pixels into the frequency domain by using a discrete cosine transform (DCT). Coefficients obtained by the DCT are divided by a scale factor and rounded to the nearest integer (a process known as quantizing) and then mapped to a one-dimensional vector via a fixed zigzag scan pattern. This one-dimensional vector is encoded using a combination of run-length encoding and Huffman encoding.

Although JPEG is a popular and widely used compression technique, it has several disadvantages. For example, one disadvantage of JPEG is that at low bit rates the DCT produces irregularities and discontinuities in a reconstructed image (known as tiling or blocking artifacts). Blocking artifacts cause the boundary between groups of 8×8 blocks of pixels to become visible in the reconstructed image. These blocking artifacts cause an undesirable degradation in image quality. Another disadvantage of JPEG is that JPEG cannot perform image reconstruction that is progressive in fidelity. In other words, if an image is encoded at a certain fidelity and a lower fidelity is later desired (for example, due to limited bandwidth or storage availability), the image must be decoded and re-encoded.

In order to overcome these shortcomings of JPEG, most modern image compression techniques use a wavelet transform technique followed by a quantization and entropy encoding. Wavelet transform (WT) is preferred over the DCT used in JPEG because WT does not have blocking artifacts and WT allows for image reconstruction that is progressive in resolution. Moreover, WT leads to better energy compaction and thus better distortion/rate performance than the DCT. WT-based compression provides compression ratios that typically are from 20% to 50% better than the JPEG standard. In fact, the performance of the WT over the DCT is so superior that all current compression techniques being considered for the JPEG-2000 standard use WT-based compression.

Most current WT-based compression techniques decompose an image into coefficients and use some form of entropy encoding (such as adaptive Huffman encoding or arithmetic encoding) of the coefficients to further compress the image. These types of encoding, however, can be quite complex and use, for example, complex symbol tables (such as in adaptive Huffman encoding) or complex data structures (such as zerotree data structures) that depend on the data types. Thus, most current WT-based techniques are complex and difficult to implement.

At least one type of WT-based compression techniques, a progressive WT-based compression technique, includes the advantages of not requiring the use of data-dependent data structures (such as zerotrees) or complex symbol tables. This progressive WT-based compression uses entropy encoding of quantized wavelet coefficients and then uses a simple data reordering structure to cluster most of the large and small wavelet coefficients into separate groups. This reordering of the wavelet coefficients is performed in a pattern that is data-independent. Moreover, this progressive WT-based compression encodes the bit planes of the reordered wavelet coefficients using an encoder that does not require complex symbol tables, such as, for example, adaptive run-length and Rice-Golomb encoders. These features make progressive WT-based compression simpler to implement than other WT-based compression techniques, such as JPEG2000.

However, progressive WT-based compression still may be difficult to implement in some applications. In particular, DCT processing of 8×8 pixel blocks (as used in the current JPEG standard, for example) has been optimized in many software and hardware implementations, but is not used in WT-based compression. Thus, in order to implement progressive WT-based compression, new software or new hardware modules must be developed and installed to perform computation of the required wavelet transforms. This additional cost and time associated with implementation can reduce the attractiveness of progressive WT-based compression.

Accordingly, there exists a need for a progressive image compression technique that is efficient, simple and easier to implement into existing hardware and software. This progressive image compression technique would retain the advantages of progressive WT-based compression and the JPEG compression standard without any of the disadvantages. Specifically, this progressive image compression technique would use the same 8×8 pixel blocks used in the JPEG standard but would not produce blocking artifacts. This would allow the progressive image compression technique to leverage existing JPEG hardware and software, therefore providing much simpler and inexpensive implementation than current WT-based compression techniques. Moreover, the progressive image compression would use data-independent reordering structures to further simplify implementation. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention is embodied in a system and method for compressing image data using a lapped biorthogonal transform (LBT). The present invention encodes data by generating coefficients using a hierarchical LBT, reorders the coefficients in a data-independent manner into groups of similar data, and encodes the reordered coefficients using adaptive run-length encoding. The hierarchical LBT computes multiresolution representations. The use of the LBT allows the present invention to encode image data in a single pass at any desired compression ratio and to make use of existing discrete cosine transform (DCT) software and hardware modules for fast processing and easier implementation.

The present invention provides several advantages over current Joint Photographic Experts Group (JPEG) and wavelet-based compression technologies. In particular, unlike JPEG compression, the present invention does not produce blocking artifacts even though, in a preferred embodiment, the present invention uses 8×8 block discrete cosine transform (DCT) as an intermediate step for computing LBT blocks. Moreover, the present invention does not use wavelets and is faster than wavelet-based compression. The present invention does not use zerotrees or other data-dependent data structures, so that implementation of the present invention into hardware or software is simplified.

In general, the system of the present invention includes a transformation module, which generates transform coefficients using a LBT and a DCT, a quantization module, which approximates scaled coefficients by integers, a reordering module, which reorders the coefficients into groups of similar data, and an encoding module, which uses adaptive run-length encoding to encode the reordered coefficients. The reordering module clusters most of the large and small coefficients into separate groups in a data-independent manner, so that zerotrees or other data-dependent data structures are not used. In a preferred embodiment, the encoding module encodes the reordered coefficients using adaptive run-length and Rice-Golomb encoding.

The present invention also includes a method for compressing image data using a hierarchical LBT. The method includes generating the coefficients using the LBT transform followed by a DCT transform, quantizing scaled coefficients by approximating them by integers, reordering the coefficients to group the image data in a data-independent manner, and encoding the reordered coefficients using adaptive run-length encoding. The present invention also includes a method for decompressing a compressed bitstream by using adaptive run-length decoding to obtain transform coefficients from the compressed bitstream, rearranging the coefficients into their original order, and using an inverse DCT transform and an inverse LBT to obtain the reconstructed image data from the decoded coefficients.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

Referring now to the drawings in which like reference numbers represent corresponding parts throughout:

FIG. 2 is a general block/flow diagram illustrating a system and method for encoding/decoding a signal in accordance with the present invention.

FIGS. 3A–3B are general block diagrams of encoders of the present invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
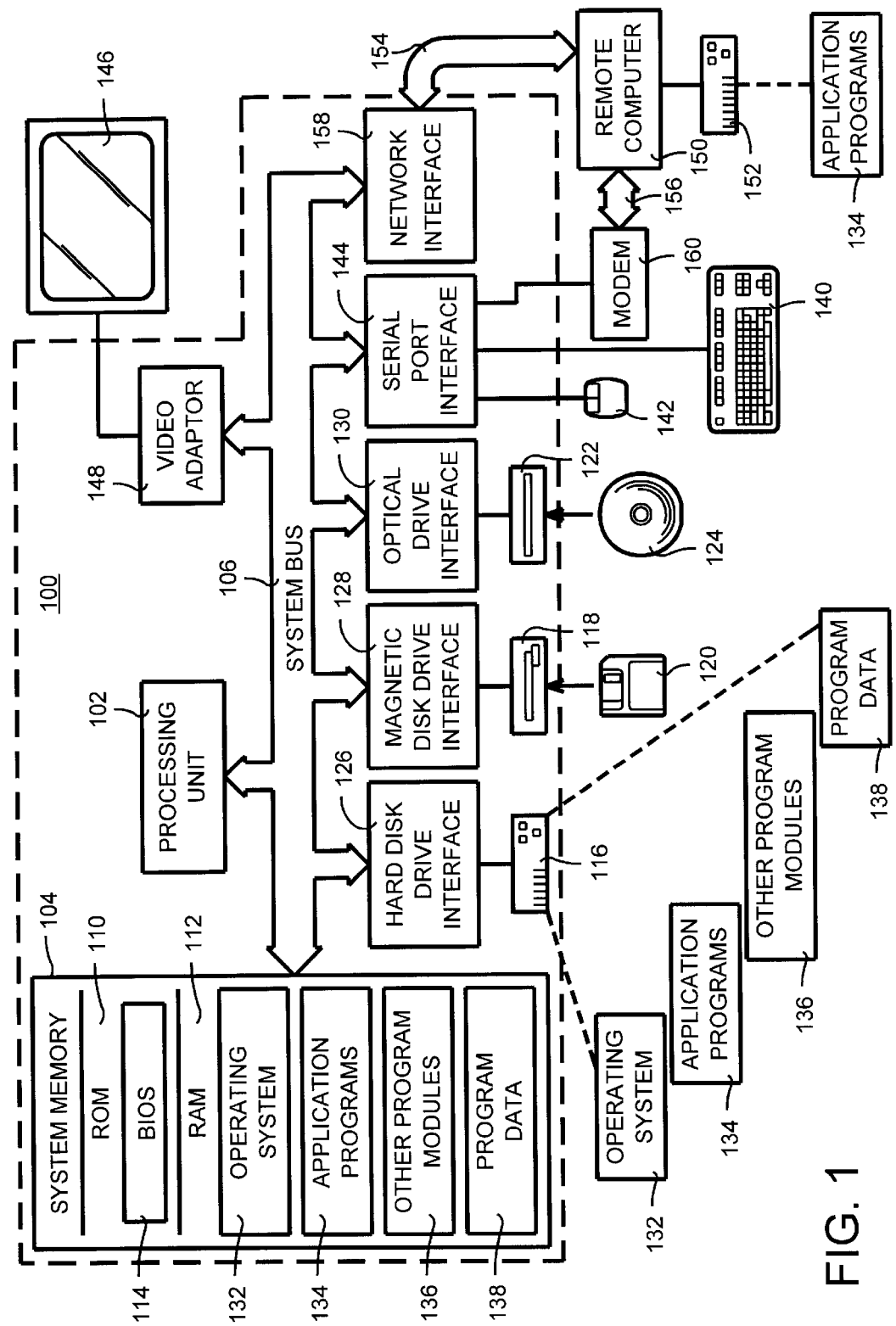
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used, such as a direct connection via an integrated services digital network (ISDN) connection.

II. Introduction

The present invention is embodied in a system and method for progressively transform coding image data using hierarchical lapped transforms for compression of the image data. The present invention allows progressive image reconstruction, both in resolution and in fidelity, with a fully embedded bitstream. The present invention uses bit-plane entropy coding of reordered transform coefficients and performs space-frequency decompositions with a lapped biorthogonal transform (LBT). The present invention achieves a rate vs. distortion performance that is comparable to current state-of-the-art coders/decoders (codecs), such as SPIHT (set partitioning in hierarchical trees). However, the LBT of the present invention reduces the number of multiplications and additions per pixel, when compared to wavelet-based systems. Further, since most of the computations in the LBT is performed by a discrete cosine transform (DCT), the present invention can make full use of fast software and hardware modules for one-dimensional and two-dimensional DCTs that are currently being used in many imaging systems.

III. General Overview

FIG. 2 is a general block/flow diagram illustrating a system and method for encoding/decoding a signal in accordance with the present invention. First, in general data 210, such as raw data bits in the form of image data, is received and processed by a hierarchical encoder 212 and an adaptive entropy coder 214 to produce an encoded bitstream 215 in accordance with the present invention (a detailed description of the encoder is provided below). The encoded bitstream 215 can be utilized in any desired manner, such as for storage or transmission (box 216) of the encoded bitstream 215. After utilization of the encoded bitstream 215, it can be sent to a digital decoder 218, which processes the encoded bitstream 215 with an inverse transformation to produce the reconstructed data 220. The reconstructed data output 220 of the decoder 218 is a close approximation to the input data 210; a human eye observing the pictures represented by the data in 210 and 220 may not perceive any differences.

In particular, the hierarchical encoder 212 comprises a transform processor 230 and can include a reordering processor 232. The transform processor 230 preferably produces a hierarchical lapped transform. The reordering processor 232 is preferably a coefficient and blocking processor that ensures certain combined coefficients represent a similar mapping between spatial domain and frequency domain as that obtained with a wavelet transform. In other words, this reordering makes the hierarchical lapped transform 230 a good approximation to a wavelet transform, to allow subsequent clustering of insignificant values. The adaptive coder 214 is preferably an adaptive entropy coder that entropy encodes bit planes of quantized and reordered transform coefficients produced by the hierarchical encoder 212. These components can be implemented with integrated circuits as computer hardware or with algorithmic routines as computer software.

IV. Components

FIGS. 3A–3B are general block diagrams of encoders of the present invention. The hierarchical encoder 212 of FIG.2 can be implemented as hierarchical encoder 312 of FIG. 3A or as hierarchical encoder 352 of FIG. 3B for image pixel encoding, with corresponding decoders shown in FIGS. 4A and 4B, respectively. While the encoders and decoders are described with respect to image pixel data as the respective input and output, it should be noted that other data can also be transformed as desired.

Figures 9, 10:
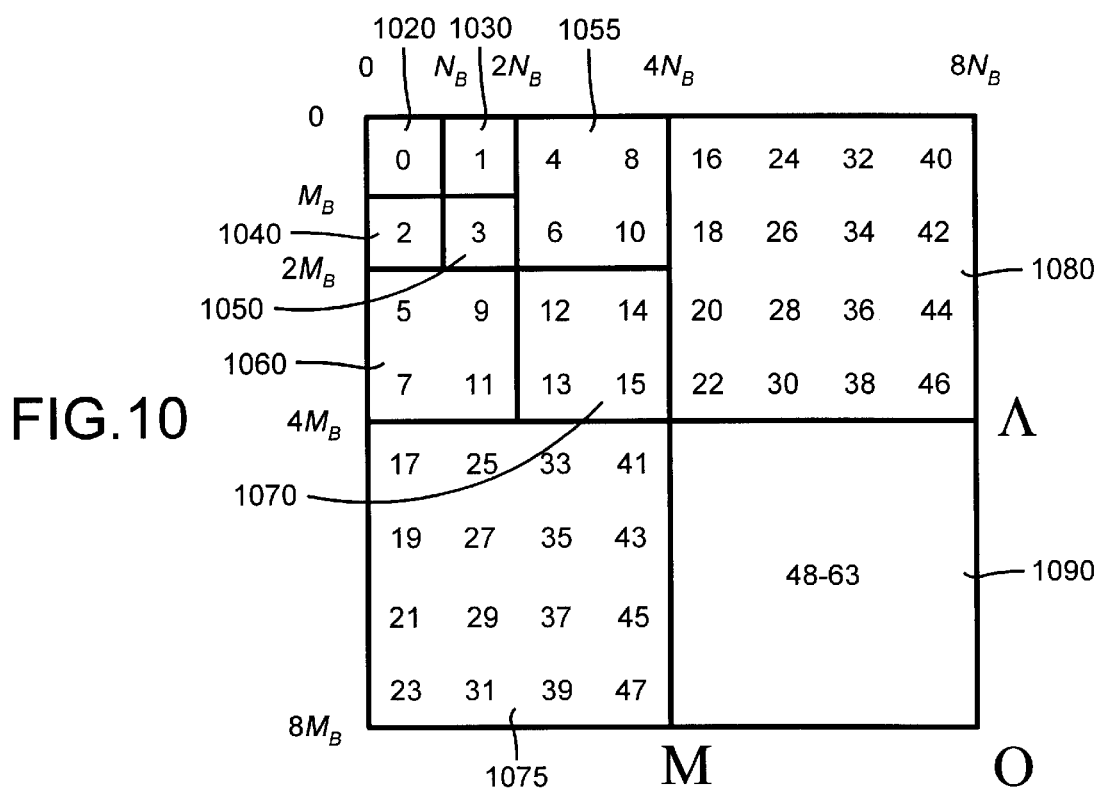
FIG. 9 is the working example of FIG. 7 represented by a block diagram illustrating reordered wavelet coefficients produced by the hierarchical lapped transform processor of FIG. 3A and FIG. 6.
FIG. 10 is a working example represented by a block diagram illustrating reordered HLT blocks produced by the block reordering module of FIG. 3A.

In the embodiment shown in FIG. 3A, image pixel data 310 is provided to a hierarchical lapped transform processor 312. The hierarchical lapped transform processor 312 includes a lapped biorthogonal transform (LBT) 330, a discrete cosine transform (DCT) 332 and a coefficient reordering processor 334 to produce a hierarchical lapped transform. The LBT performs space-frequency decompositions and produces transform coefficients from the original input. The DCT helps increase the compression performance by further transforming groups of the lowest frequency coefficients of the LBT blocks. The outputs of the DCT operator represent low-frequency variations of a large regions of support, in a form analogous to the course resolution coefficients of a wavelet transform. The coefficient reordering processor 334 ensures combined LBT and DCT coefficients represent an appropriate mapping between the spatial domain and the frequency domain to ensure that the hierarchical lapped biorthogonal transform represents a good approximation to a wavelet transform. This allows subsequent clustering of insignificant values by a block reordering processor 318 after quantization of the hierarchical lapped biorthogonal transform by quantizer 314. One set of such grouping is shown in FIG. 9, for an example with blocks with 64 coefficients.

Quantization can be performed by a uniform quantizer, which is controlled by a quantization step defining threshold T. This results in the representation of each coefficient falling between the steps by the value in the middle of the step. The smaller T, the less loss is incurred in the quantization. Thus, the output of the quantizer 314 is a series of integer numbers, which are quantized coefficients. As in many other applications, the quantizer may be based on normal rounding, or in rounding towards zero (also known as a quantizer with a "dead zone").

The block reordering processor 318 groups coefficients into clusters of like values. It results in a clustering or grouping together of the blocks of frequency coefficients, which are most likely to be zero. The reordering increases the likelihood of groupings of similar data, in the sense that the data tends to have approximately monotonically decaying distribution of amplitudes. The first blocks tend to have data of larger amplitude, whereas in subsequent blocks the amplitudes of the coefficients tend to decay. The grouping is done by fixing a scanning order, which is data independent. One set of such grouping is shown in FIG. 10, for an example with 64 blocks of coefficients. In FIG. 10, low frequency components are placed toward the upper left corner of the grouping with an alternation of blocks of coefficients from low-high and high-low subbands at each level and is discussed in detail below.

An adaptive encoding block 320 receives the macroblocks and encodes them in a lossless manner to produce an encoded bitstream 322. The clustering of the blocks provide data to compress, which has large clusters of zeros. Further reordering the data by encoding on a bit plane basis increases the likelihood of finding large strings of zeros. Starting with the most significant bit for the first bit plane leads to a higher likelihood of long strings of zeros. Further, this also ensures that the most relevant data is encoded first. By the time the third or fourth bit planes are encoded, the odds are about equal for a zero as opposed to a one, and straight binary encoding may be effectively used.

The encoder 320 is preferably an adaptation of a Golomb-Rice encoder with adaptive run-length modifications. In simple terms, a string of $2^k$ zeros is represented by the codeword consisting of a single bit equal to zero. The length of the string of zeros represented by the zero codeword is controlled by the parameter k, which is varied as data is encountered, based on the observed frequency of zeros. When a zero value is encoded, it is assumed that zeros are more likely, and so the value of the parameter k is increased. When a nonzero value is encountered, k is decreased. By controlling the amount of such increase and decrease appropriately, the encoder can track well a string of bits with a varying probability of zero, without the need of the overhead of actually estimating that probability.

A feedback loop 324 is used to represent the backwards adaptive nature of the encoder 320. This encoding provides for efficient compression and fast adaptation to changes in the statistics of the incoming data. Encoder 320 provides a bitstream output that is inherently progressive, in that the most relevant information is provided at the beginning of the bitstream. Since the least significant bits are encoded in the last bit plane, for lower resolution bitstreams, they may effectively be discarded or not encoded. This is useful for lower bandwidth transmissions of data. This scalability control by discarding of least significant bit planes, wholly or in part, can be performed by the encoder itself or by any element of a communication or storage system, in order to produce a lower fidelity representation of the data. For example, if the data is to be transmitted through the Internet, a server or router may parse the encoded bitstream to decide how many bit planes can be transmitted to a particular decoder client. In another example, if a memory management module in a digital camera needs more memory space for an additional picture, it can remove bitplanes from previously shot pictures to generate such space.

The embodiment 350 shown in FIG. 3B is similar to the embodiment 300 of FIG. 3A, with the exception that the coefficient reordering processor 334 and the block reordering processor 318 are integrated as a combined coefficient and block reordering processor 360, as shown in FIG. 3B. In this embodiment 350, the procedures performed by the coefficient reordering processor 334 and the block reordering processor 318 of FIG. 3A are performed after quantization of the hierarchical lapped transform as a combined step in the embodiment 350 of FIG. 3B. Since the procedures of the coefficient reordering processor 334 and the block reordering processor 318 of FIG. 3B are performed in an efficient combined process, the embodiment 350 of FIG. 3B is preferred.

Figure 4A:
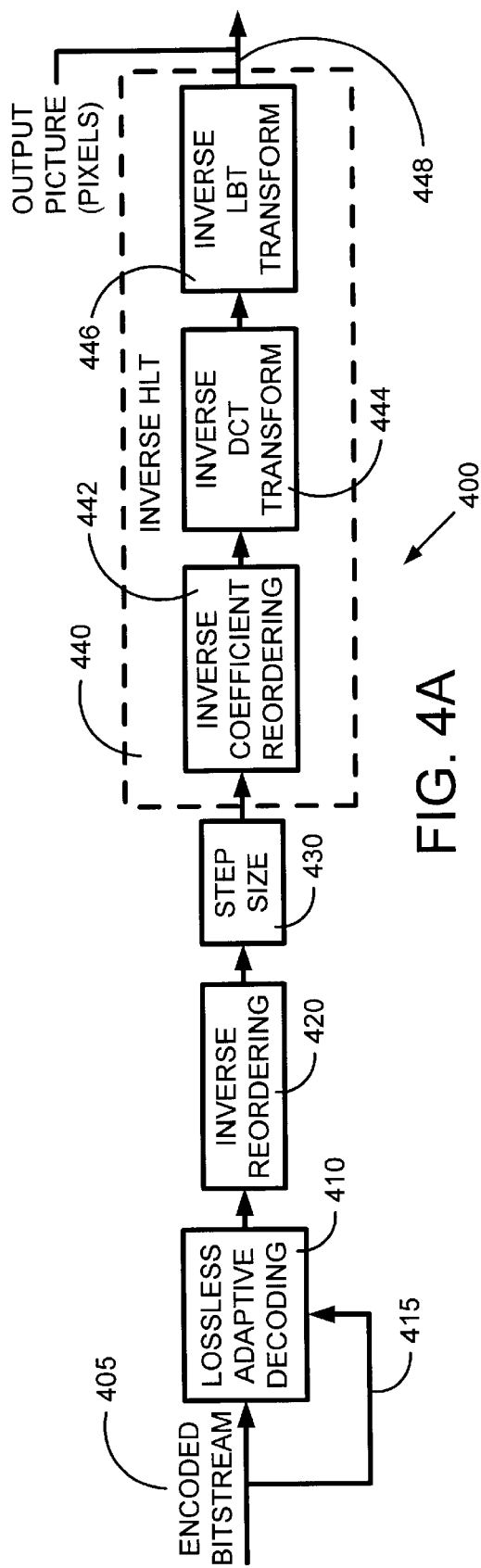
FIGS. 4A–4B are general block diagrams of decoders related to the encoders of FIGS. 3A and 3B respectively, in accordance with the present invention.
Figure 4B:
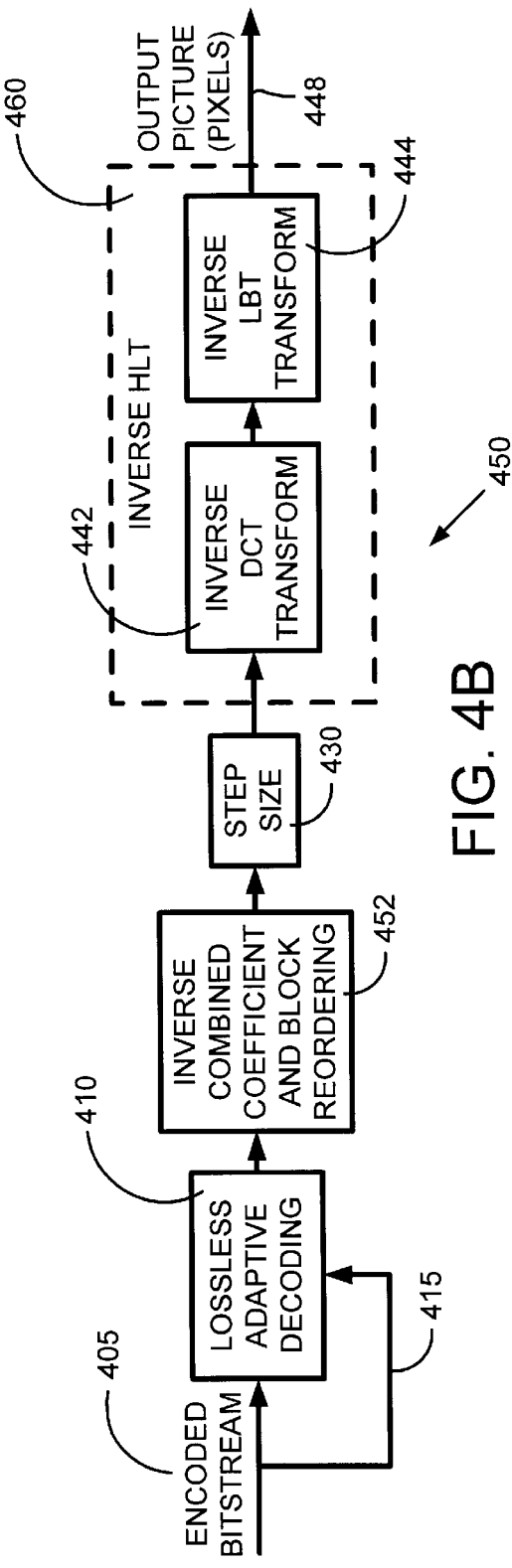

FIGS. 4A–4B are general block diagrams of decoders related to the encoders of FIGS. 3A and 3B respectively, in accordance with the present invention. The decoding embodiments 400, 450 of FIGS. 4A and 4B, respectively, are essentially the inverse of the encoding and data transformations of FIGS. 3A and 3B, respectively. For the decoding process of the embodiment 300 of FIG. 3A, which relates to embodiment 300 of FIG. 3A, a bitstream of encoded data 405, such as that produced by the encoder of FIG. 3A, is received at a lossless adaptive decoding processor 410. The bitstream 405 may be received directly from the decoder, from local storage, or from a remote decoder or storage via one of many viable transmission media such as by removable memory cards, satellite transmission, cable transmission or other network.

Lossless decoding processor 410 receives the encoded bitstream and recreates the adaptation rules developed during encoding via a feed forward line 415. Processor 410 essentially receives the string length to be used, and reconstructs the data in accordance with the rules. Again, it operates on a block level, but this is not a requirement of the invention. It simply makes it more convenient than working with an entire representation of an image or other data all at the same time, which would require a larger amount of memory, or paging if such memory was not available. One form of fidelity reduction may be performed at processor 410 just by not decoding the last bit plane. This effectively doubles the step size controlled by the parameter T. It is a simple way to reduce the fidelity of the data. In general, more bit planes can be dropped, in whole or in part, by processor 410.

The output of processor 410 should be identical to the integer data coming out of block 318. However, higher resolution layers of the image may be removed at this point as indicated, just by effectively not using higher frequency coefficients. This would be useful if the window used to display an image or set of images is small. Inverse reordering processor 420 then is used to unshuffle or reorder the blocks back to the original positions. The output of the inverse reordering processor 420 is the integer numbers that need to be remultiplied back at block 430 by using a step size that is provided by a header in the received bitstream. This provides reconstructed coefficients that closely approximate those of the original image data. The header also provides information about how big the image size is, and other standard image format data. An inverse hierarchical lapped transform 440 is then performed by inverse coefficient reordering 442, inverse DCT transform 444, and inverse LBT transform 446, which are basically the respective inverses of the coefficient reordering 334, DCT transform 332 and LBT transform 330 of FIG. 3A. It should be noted that the only losses, other than selected desired fidelity or resolution reductions, are incurred in the quantization steps, which is controllable by modification of the T parameter. Consequently, the decoding scheme 400 produces an output reconstructed data that substantially matches the input data 310 of FIG. 3A.

The decoding embodiment 450 shown in FIG. 4B relates to the embodiment 350 of FIG. 3B and is similar to the decoding embodiment 400 of FIG. 4A. However, the inverse coefficient reordering processor 420 and the inverse coefficient reordering processor 442 are integrated as a combined inverse coefficient and block reordering processor 450, as shown in FIG. 4B. In this embodiment 450, the procedures performed by the inverse coefficient reordering processor 420 and the inverse coefficient reordering processor 442 are performed before being remultiplied back at block 430, as a combined step.

The adaptive encoding and decoding of the present invention operates very well on data that has clustered zeros with statistics that change. This type of data may also be characterized as having a high probability of data with near exponential decay of the probability on either side of the zeros. Multimedia data, such as static image data and video has this characteristic. Further, the transformation of many types of physical data also has this type of characteristic. When capturing physical data, the information normally occurs in just a few places, which means that most of the other data is zero. Symmetry of the data is also a desired characteristic for this type of encoding to work best. In other words, an exponential fall off of both negative and positive values on either side of an information spike is beneficial. Examples of such physical data include ECGs and other biometric type of data.

V. Details of the Components and Operation

Figure 5A:
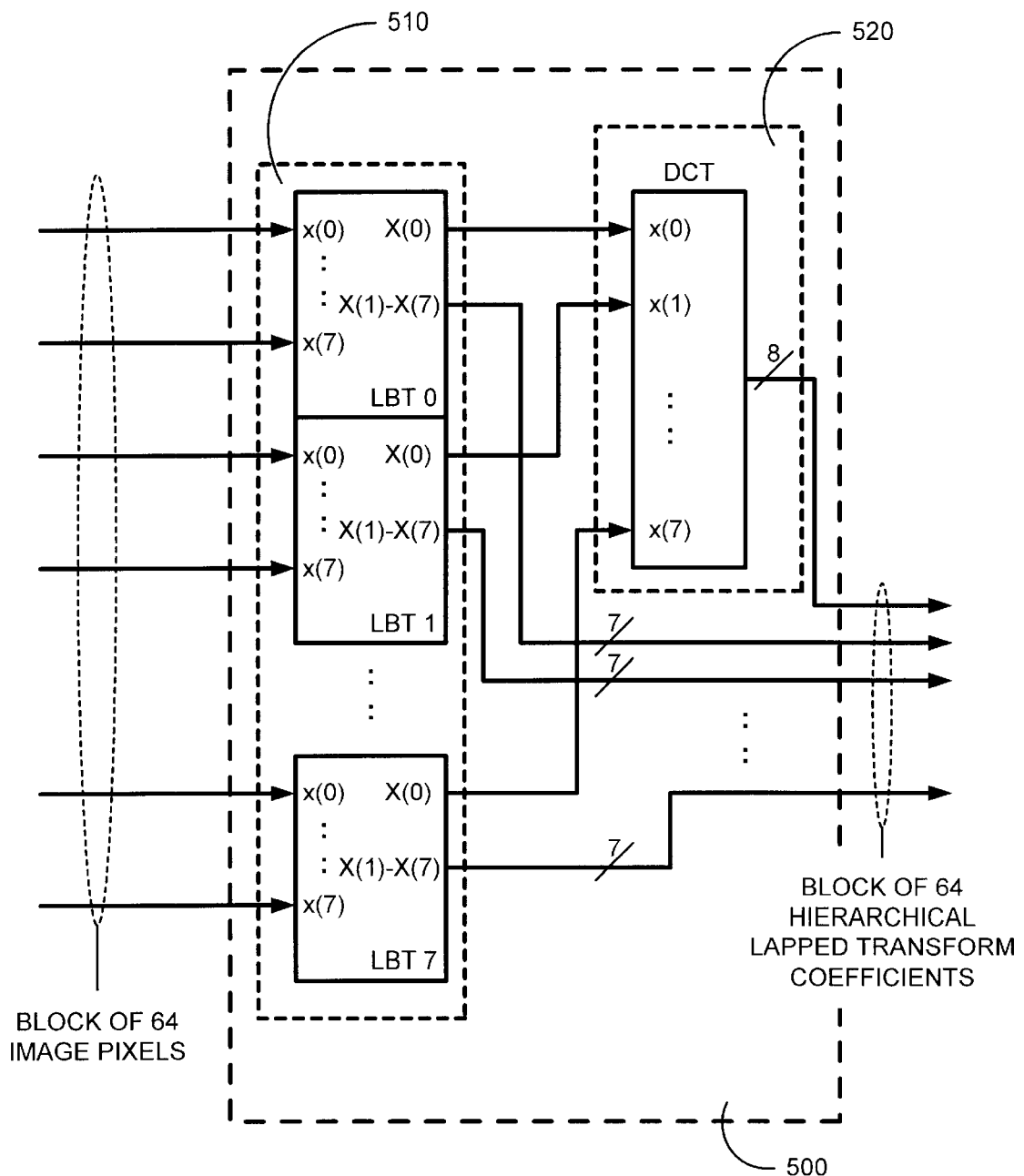
FIG. 5A is a block diagram of the hierarchical lapped transform (HLT) processor of the present invention.

FIG. 5A is a block diagram of the hierarchical lapped transform (HLT) processor 500 of the present invention. The HLT processor 500 uses a two-level hierarchical decomposition of both LBT and DCT transforms that transforms a sample of input pixels to a frequency domain representation. The HLT processor 500 of the present invention produces essentially no blocking artifacts, few ringing artifacts and has a much lower computational complexity than processors using a lapped orthogonal transform (LOT).

In general, the HLT processor 500 cascades LBT blocks to generate LBT coefficients, combines and outputs these LBT coefficients, applies DCT blocks to a subset of the LBT coefficients (typically the lowest-frequency coefficients) and outputs HLT coefficients for reordering. Reordering of the HLT coefficients is performed to produce a space-frequency decomposition similar to that of a six-level wavelet transform. This maintains the scalability (in fidelity and resolution) and embedded bitstream features, while greatly reducing the computational complexity of the space-frequency decomposition. In addition, because the HLT processor 500 preferably uses two-dimensional 8×8 DCT blocks, any specialized software or hardware module designed for two-dimensional DCT (such as those used in a JPEG codec) can be leveraged by the HLT processor 500.

The HLT processor 500 includes two decomposition modules: a first decomposition module, a LBT module 510, which computes LBT operators and a second decomposition module, a DCT module 520, which computes DCT operators. A DCT decomposition is used in the DCT module 520 (instead of another LBT decomposition) because blocking artifacts are already removed by the LBT module 510. FIG. 5A illustrates a preferred embodiment whereby the HLT processor 500 produces a six-level space-frequency decomposition that, as discussed above, is similar to a six-level wavelet transform, but instead uses a HLT.

As shown in FIG. 5A, a block of input values (such as image pixels) is received by the LBT module 510 and processed (as discussed below) such that groups of LBT coefficients are produced. Some of these LBT coefficients are, preferably, reordered and sent as output from the HLT processor 500. As shown in FIG. 5A, LBT coefficients X(1) through X(7) are sent as output from the HLT processor 500. Other LBT coefficients (in this case, X(0)) are received as input by the DCT module 520 and processed. The output of the HLT processor 500 is a block of HLT coefficients that contain a mixture of LBT operators and DCT operators. For example, in FIG. 5A each HLT block is a cascade of eight consecutive LBT operators and one DCT operator of length eight. Thus, the HLT processor 500 maps a group of 8 pixel blocks (or 64 pixels) into 64 HLT coefficients.

Figure 5B:
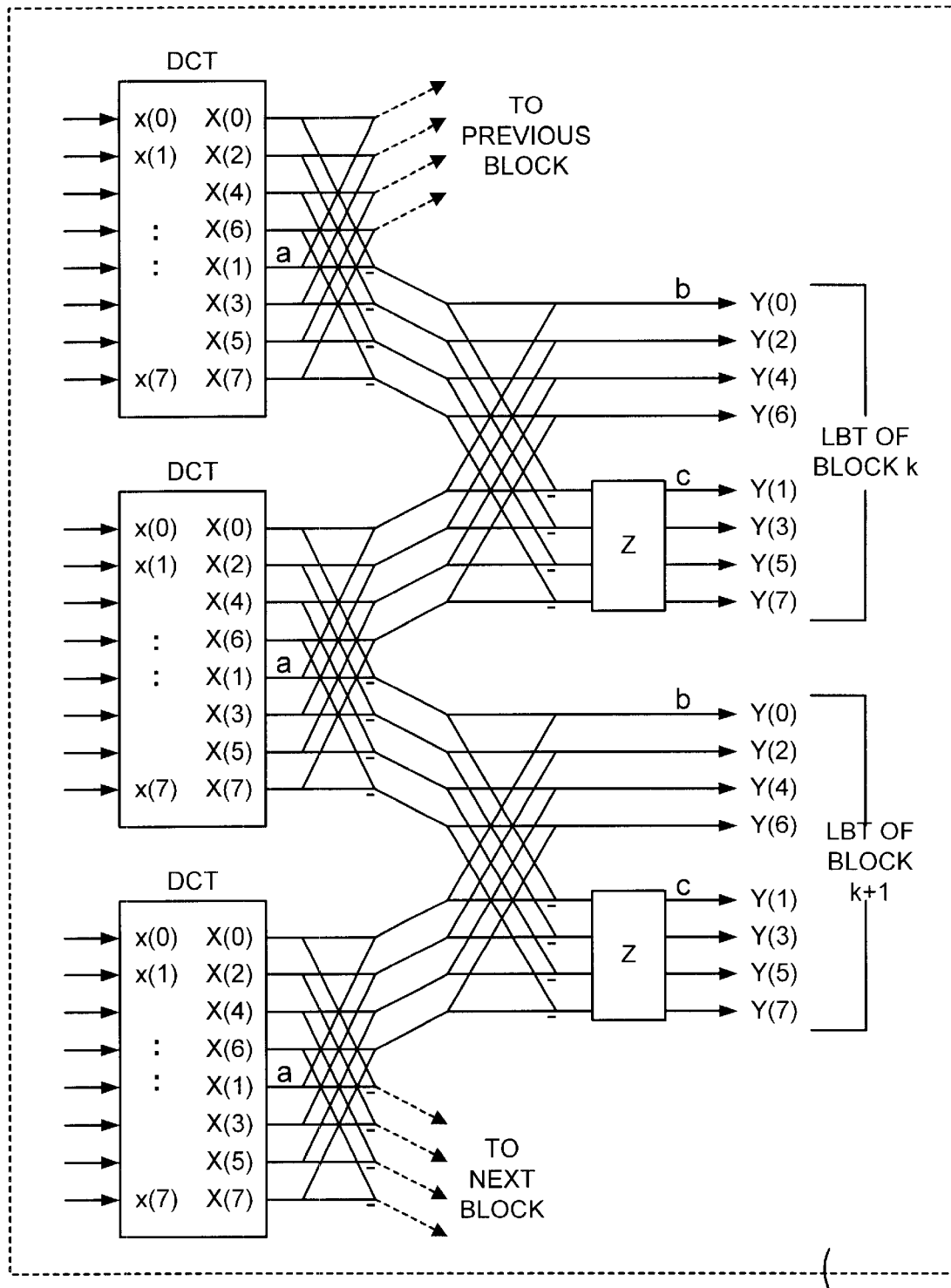
FIG. 5B is a block diagram of the LBT module of the HLT processor of FIG. 5A of the present invention.

FIG. 5B is a block diagram of the LBT module 510 of the HLT processor 500 of the present invention. In general, the LBT module 510 receives an input signal, cascades LBT blocks to generate LBT coefficients and combines and outputs these LBT coefficients. Specifically, the LBT module 510 receives a vector x(n) containing n samples of an input signal (such as pixel values) and transforms the vector x(n) into another vector X(N) containing N DCT operators. The LBT module 510 generates LBT coefficients for each block by combining DCT coefficients of adjacent blocks. These LBT coefficients, Y(M), are arranged in groups of odd and even Ms that together represent the LBT coefficients of a block. It should be noted that, in this implementation, N=M=8, such that the input signal vector (x(0) to x(7)) produces the DCT operators (X(0) to X(7)) and corresponding LBT transform vectors (Y(0) to Y(7)) as an output to the DCT module 520.

As discussed further below, the LBT module 510 generates LBT coefficients for each block using mainly +1/−1 butterfly operators. Scaling factors {a,b,c} control the shape of the basis functions, and as long as inverse scaling factors {1/a,1/b,1/c} are used in the inverse transform, the transform is guaranteed to be biorthogonal. This means that in the absence of quantization (which introduces lossy effects) the input data is recovered exactly by the inverse transform. The additional scaling factors b and c allow the coding gain to be maximized, assuming that all coefficients are quantized with the same step size. One example of scaling factors {a,b,c} that may be used with the. LBT are given in Table 1.

TABLE 1

Example scaling factors for the LBT.

| Parameter | Direct Transform | Inverse Transform |
|---|---|---|
| a | $\sqrt{2}$ | $\sqrt{1/2}$ |
| b | $\sqrt{3/4}$ | $\sqrt{4/3}$ |
| c | $\sqrt{4/5}$ | $\sqrt{5/4}$ |

The operator Z 530 is an orthogonal matrix that is used to control the shape of the odd basis functions. As can be seen from FIG. 5B, there is overlapping across consecutive blocks that helps eliminate any blocking artifacts. It should be noted that FIGS. 5A and 5B illustrate one way in which the operation of the HLT processor 500 may be implemented, and those skilled in the art will recognize numerous other implementations that may be used.

Figure 6:
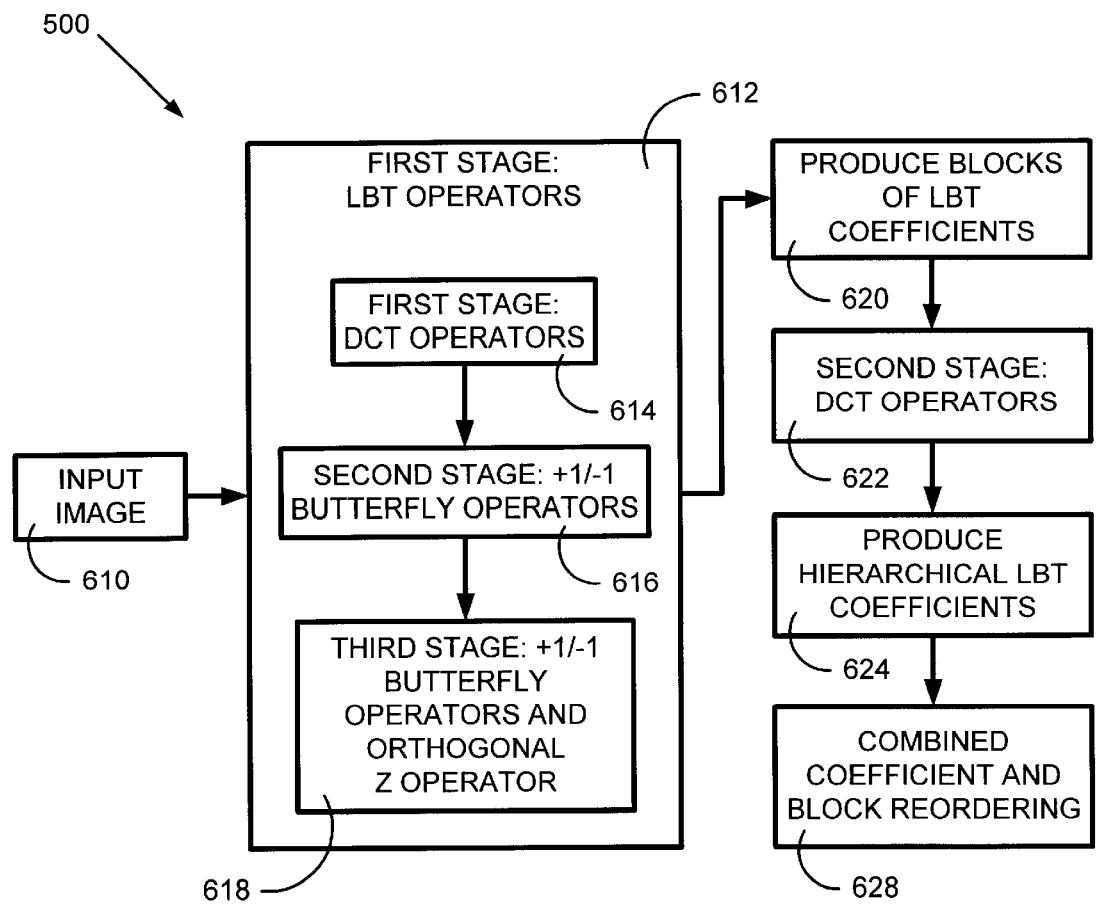
FIG. 6 is a flow diagram of the hierarchical lapped transform processor of FIG. 5A the present invention.

FIG. 6 is a flow diagram of the hierarchical lapped transform processor of FIG. 5A of the present invention. In general, the HLT processor 500 first receives input data, such as pixel data (box 610), a first stage generates LBT operators from the pixel data (box 612). The first stage (box 612), which is a flow diagram of the LBT processor of FIG. 5B, includes a first sub-stage (box 614), a second sub-stage (box 616) and a third sub-stage (box 618). The first sub-stage (box 614) computes DCT operators for each input pixel block. The second sub-stage (box 616) performs cascading butterfly operations with window functions on the DCT operators and the third sub-stage (box 618) performs additional cascading butterfly operations and orthogonal operations on the DCT operators to control the shape of the odd basis functions.

The input data is mapped to a cascade of butterflies using a first set of weights and the cascade of butterflies is reordered. The first stage (box 612) produces blocks of LBT coefficients (box 620) for a second stage that produces DCT operators (box 622) for generating hierarchical coefficients lapped biorthogonal coefficients (box 624) for reordering (box 628). Namely, a spatial transform is computed from the reordered cascade of butterflies to produce the hierarchical coefficients lapped biorthogonal coefficients.

The pixel data can be processed by rows and then by columns and results in a two-dimensional transformation. Preferably, the HLBT can be computed by successfully processing overlapping blocks of M×N (typically 64) pixels. In the row/column approach, the rows and columns are processed in two steps. For instance, first, a set of LBTs of length N can be computed and then a set of DCTs of length M can be computed. In one example, N=M=8, however, other choices are possible. For example, N and M can be chosen so that they are powers of 2 (such as 2, 4, 8, 16 and so forth) to make the computation of transforms faster. Generally, the values of N and M would be increased for a very large image (such as an image containing more than 2,000 by 2,000 pixels).

VI. Working Example

Figure 7:
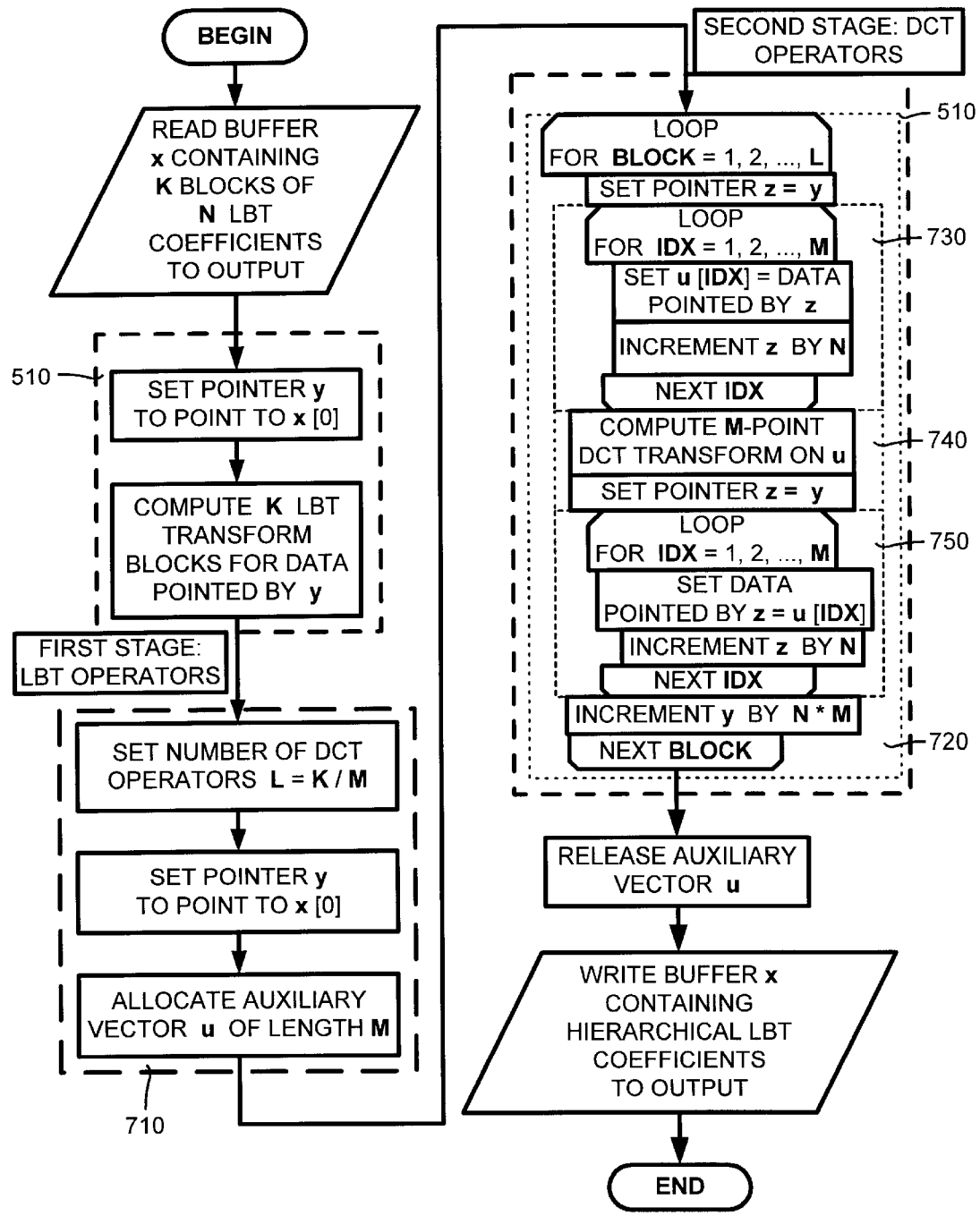
FIG. 7 is a working example represented by a flow diagram illustrating the detailed operation of the components of the hierarchical lapped transform processor of FIG. 6.

FIG. 7 is a working example represented by a flow diagram illustrating the detailed operation of the components of the hierarchical lapped transform (HLT) processor 500 of FIGS. 5 and 6. The HLT processor 500 begins and reads a buffer containing pixel data. In this example, the data within the buffer is grouped into K blocks of length N. The LBT module 510 takes the data within the buffer one block at a time (by setting a pointer) and computes K LBT transform blocks and LBT operators for the data pointed to by the pointer.

Next, in box 710, a number of DCT operators, L, is determined by dividing the number of blocks K by the number of DCT coefficients M. In addition, a vector u of length M is allocated in memory to receive the computed DCT coefficients. The HLT processor 500 then proceeds to the DCT module 520 where the DCT operators are computed and used to construct the vector u. In loop of box 720, a block is selected and a loop of box 730 is entered whereby the vector u is filled with every Nth LBT coefficient computed earlier. The DCT transform of every Nth LBT coefficient is determined in box 740. In box 750, each of the DCT coefficients computed in box 740 are used to construct the vector u. The DCT operators and the LBT operators are then stored in memory. Together, the DCT operators and the LBT operators make up the HLT coefficients that are sent as output from the HLT processor 500.

Figure 8A:
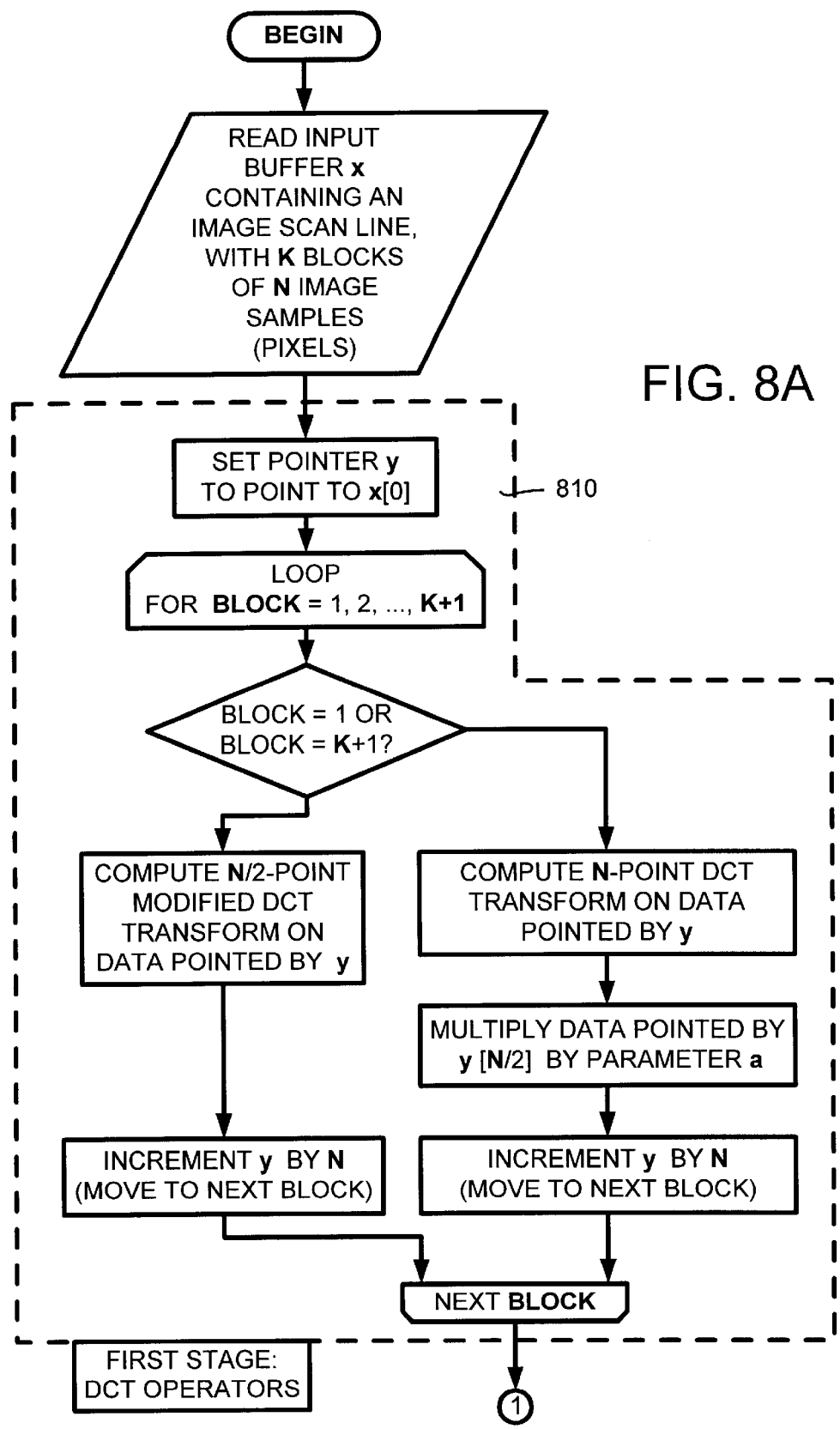
FIG. 8 is the working example of FIG. 7 represented by a flow diagram illustrating detailed operations and computations to derive the lapped biorthogonal operators of the hierarchical lapped transform processor of FIG. 7.
Figure 8B:
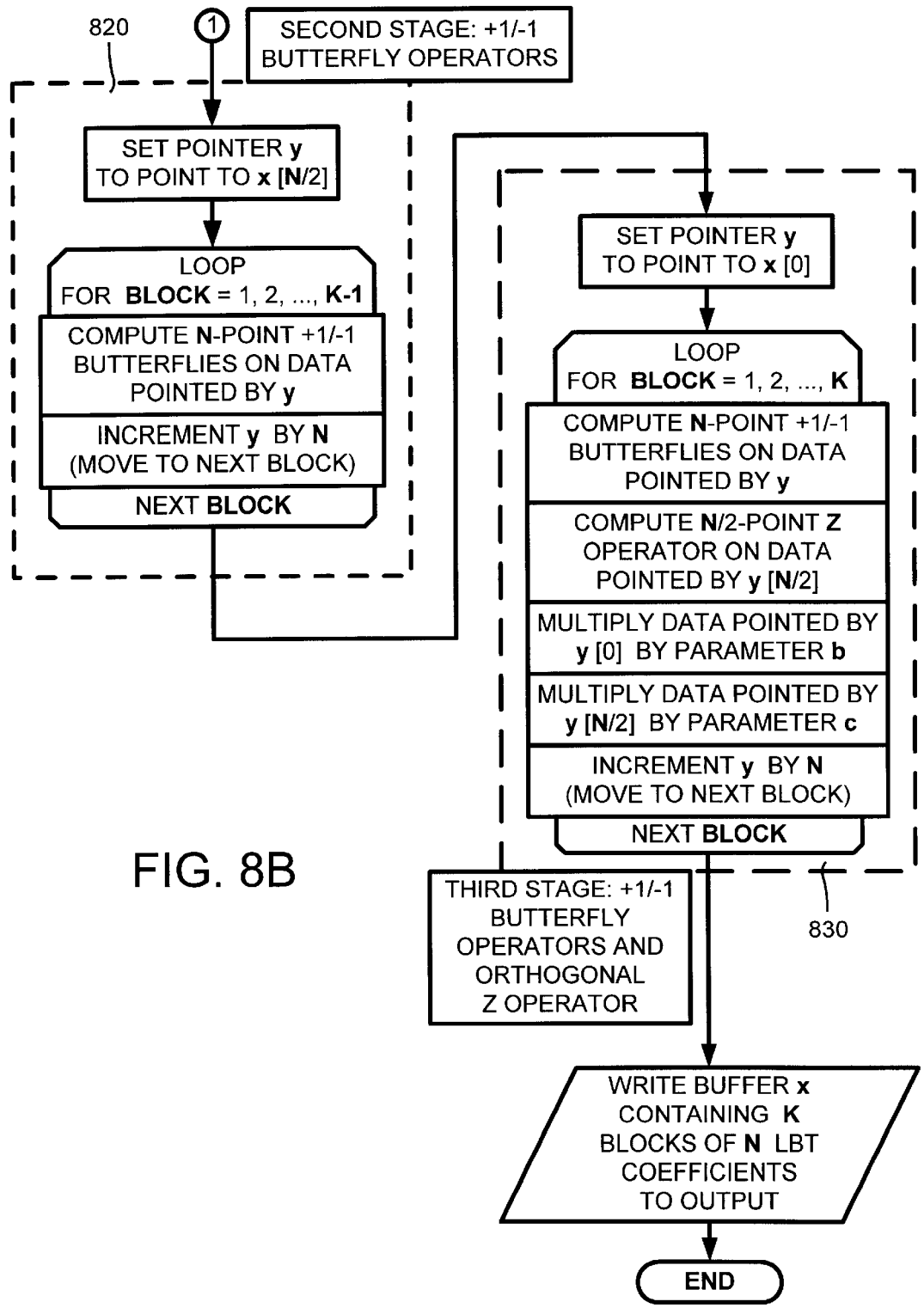

FIG. 8 is the working example of FIG. 7 representing a flow diagram illustrating detailed operations of the LBT module 510 of FIG. 7. In general, the LBT module 510 includes a DCT operator module 810, which computes DCT operators for each input pixel value, a first butterfly operator module 820, which performs butterfly operations on the DCT operators, and a second butterfly module 830 that performs additional butterfly operations and orthogonal operations on the DCT operators.

The working example of FIG. 8 begins by reading an input buffer containing blocks of image sample (or pixels). The DCT operator module 810 receives this data as input and computes DCT operators for the data in each block. If the block is a first block the DCT operator module 810 uses a scaling factor a to control the shape of the basis functions. The computed DCT operators (except for the first block) are sent to the first butterfly operator module 820. The first butterfly operator module 820 computes +1/−1 butterflies for each DCT operator within each of the blocks. This data is received by the second butterfly operator module 830 in addition to the first block and for each of the blocks additional butterfly operations are performed. In addition, the second butterfly operator module 830 uses additional scaling factors b and c to further control the shape of the basis functions. Further, an orthogonal operator Z is used on the odd basis functions to control their shape. The computed LBT coefficients are sent as output from the LBT module 510.

FIG. 9 is the working example of FIG. 7 represented by a block diagram illustrating a first reordering of HLT coefficients. This first reordering is used to have the space-frequency relationships of the HLT coefficients for each N×N LBT block more closely approximate those of wavelet coefficients. Although HLT coefficients produced by the HLT processor 500 generate a multiresolution decomposition, this first reordering is performed to approximate the time-frequency decomposition achieved with wavelet transform coefficients. The first reordering occurs according to the matrix shown in FIG. 9, where, in this working example, N=8.

The diagram of FIG. 9 indicates that if there are HLT coefficients numbered in a row-scan order (i.e., [0 1 2 3 4 5 6 7] in the top row, [8 9 10 11 12 13 14 15] in the second row, and so forth), the HLT coefficients should be reordered as shown in FIG. 9. Moreover, the DCT operators of the HLT coefficients are further processed with the DCT operators, which occurs independent of the HLT reordering shown in FIG. 9. Thus, HLT reordering may be performed either before or after computation by the DCT module 520.

FIG. 10 is a working example represented by a block diagram illustrating reordered HLT coefficients produced by the reordering and blocking module of FIG. 3A. A second reordering is performed in accordance with FIG. 10 to cluster any insignificant values. In FIG. 10, each number within the figure represents the scanning order of a block of $M_B \times N_B$ HLT coefficients. The reason for the alternate scanning of the low-high (LH) and high-low (HL) HLT coefficients within the same resolution level is simple. Assuming the original image has a particular feature (or no feature) at some spatial location, it is likely that clusters of both the LH and HL subbands, corresponding to that location, will have large (or small) values. Therefore, by ensuring that pairs of blocks from the LH and HL subbands corresponding to the same spatial location appear contiguously in a macroblock or at least proximate or close to each other, we're more likely to create clusters of large and small values. That increases the probability of long runs of zeros in the bit planes of the quantized coefficients.

Figure 11:
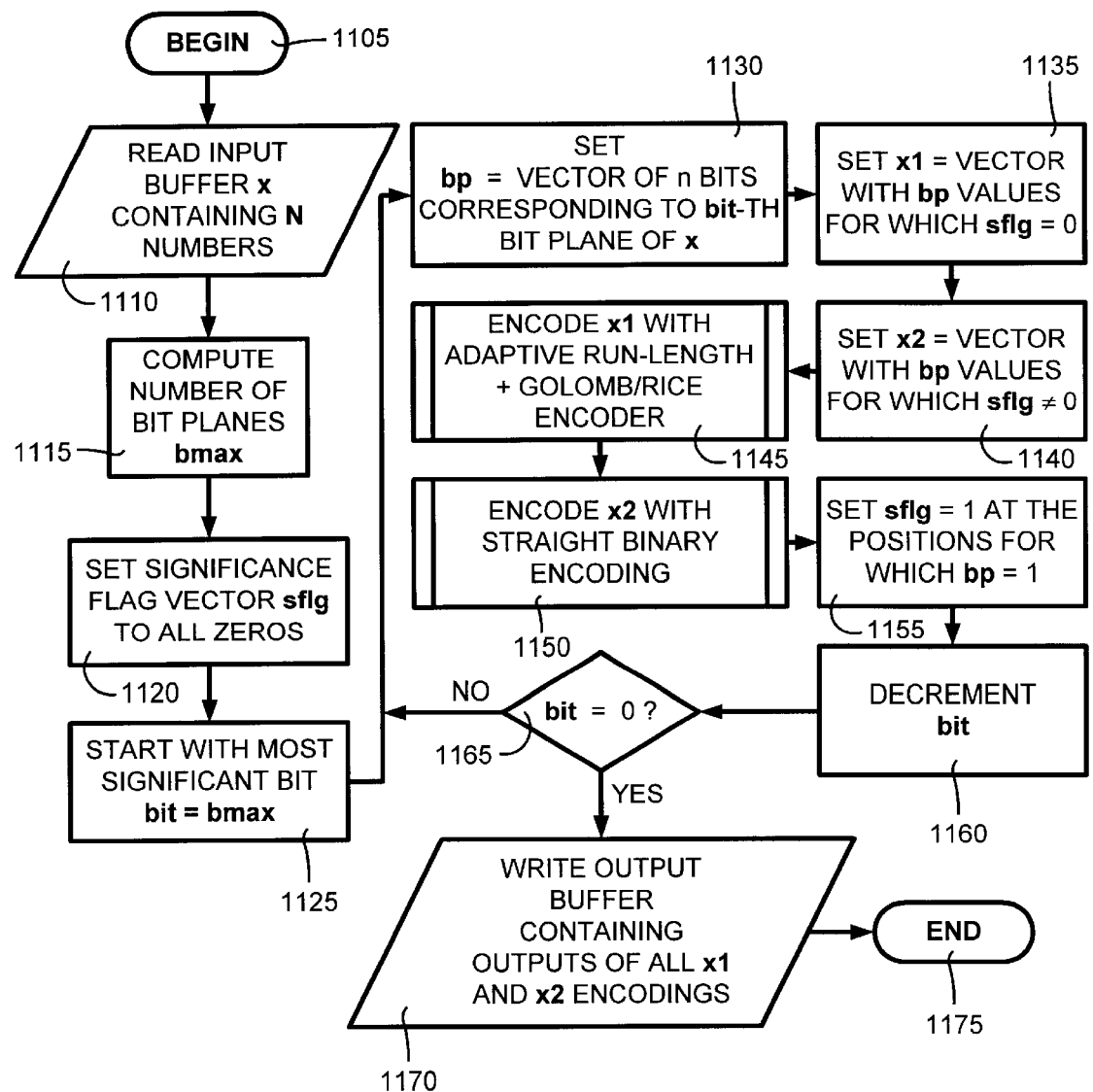
FIG. 11 is a working example represented by a flow chart showing the general operation of the lossless adaptive coefficient encoder of FIG. 3A.

FIG. 11 is a working example represented by a flow chart showing the general operation of the lossless adaptive coefficient encoder of FIG. 3A, which separates the coefficients into bit planes and encodes them using an adaptive run-length encoder. The process begins (box 1105) and the bit planes are read from an input buffer x (box 1110) that contains N numbers. The number of bit planes, bmax, is computed (box 1115) and a significance flag vector, sflg, is set to all zeros (box 1120). Encoding begins with the most significant bit plane and a bit plane index variable bit is set equal to bmax (box 1125). The values of the bits pointed to by the index "bit" form the bit plane vector bp (box 1130). For each plane bp, the bits are divided into two subsets (box 1135 and box 1140. A significant bits, x1, corresponds to positions for which a "1" entry has not been seen in the higher planes. A refinement bit, x2, corresponds to positions for which a "1" entry has already been seen in the higher planes.

Next, x1 is encoded with the adaptive run-length+Golomb-Rice (ARLGR) encoder (box 1145) that benefits from a higher frequency of zeros in x1. For every bit equal to 1 in x1, the sign bit is also encoded and appended at the end of the output code. Straight binary encoding is then used to encode x2 (box 1150). This is performed by appending the x2 bits to the output stream. Minimal loss in encoding efficiency is encountered because zeros and ones are usually equally likely in x2. It should be noted that the sign bits are not referred to as a bit plane because they are not processed as a bit plane. The sign bits are sent in the process of coding the x1 vectors of each bit plane. Therefore, the vector x1 can be thought of as being drawn from the alphabet $\{0, +1, -1\}$, i.e. bit plus sign.

An important property of the flow chart in FIG. 11 is that the information on which are the bits that belong to x1 and which are the bits that belong to x2 does not need to be explicitly encoded. The vector sflg controls the allocation of bits to x1, and sflg is first initialized to all zeros, and then updated after each bit plane is encoded (box 1155). Thus, the decoder can easily track the changes to sflg. Continuing to the next bit plane, a bit is decremented (box 1160) and checked to determine if the last plane has been decoded (box 1165). If not, control is passed to box 1130 for encoding of the next bit plane. If bit was equal to zero, or a higher number of a lower resolution encoding is desired, an output buffer containing outputs of all x1 and x2 encodings is written (box 1170) and the process ends (box 1175).

In the present invention, the Golomb-Rice codes for a source of binary digits are combined with RL codes. This results in a Run-Length+Golomb-Rice (RLGR) code, which is characterized by a parameter k that controls the length of the run associated to the codeword 0 (where the maximum run length is equal to $2^k$). For a given source of input vectors, using either the $\{0,1\}$ or the $\{0,+1,-1\}$ alphabets, the parameter k should be chosen in order to minimize the expected code length. If the source has no memory, has constant statistics over time, and is characterized by $P_0 = \text{Prob}\{\text{symbol}=0\}$, then it is easy to compute the optimal value of k as a function of $P_0$.

In practice, however, binary (or binary+sign) vectors are not stationary. Typical examples include data obtained from the physical world, such as quantized wavelet coefficients of pictures or scanned documents. Therefore, we need to adjust the RLGR parameter k over time, to best match the local statistics of the data. Many strategies have been considered, mostly involving dividing the input data in blocks of appropriate length. For each block, $P_0$ is estimated and then the optimal value of k is computed. An additional code is then sent at the beginning of each block to indicate the value of k that should be used by the decoder.

The coefficient encoder of the present invention uses a backward-adaptive strategy for changing the RLGR parameter k. By backward-adaptive, it is meant that variations in k are computed based on encoded symbols, not directly on the input data. The basic strategy is that the value of k to be used in encoding the next symbol should depend only on previously encoded data. Therefore, all the decoder needs to do to recover the changing values of k is to apply the same adaptation rule as the encoder. Therefore, to simplify decoding it is important that such a rule be as simple as possible to compute.

Figure 12:
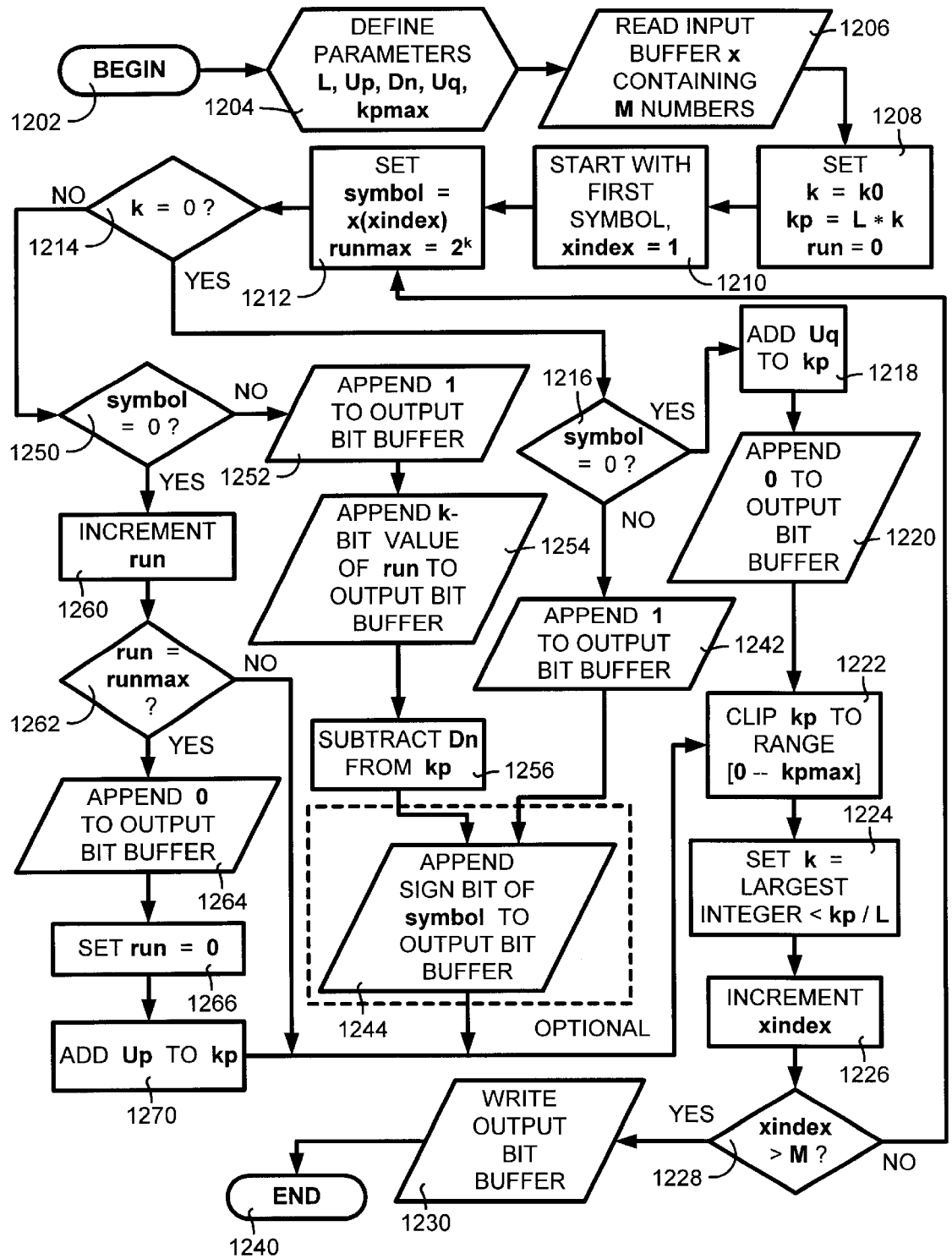
FIG. 12 is a working example represented by a flow chart illustrating further detail of the working example of the adaptive run-length+Golomb-Rice encoder of FIGS. 11 and 3A.

The adaptive Run-Length+Golomb-Rice (ARLGR) encoder of the present invention uses the following rules for changing the parameter k. FIG. 12 is a working example represented by a flow chart illustrating further detail of the working example of the adaptive run-length+Golomb-Rice encoder of FIGS. 11 and 3A. The process starts (box 1202) with defining several parameters (block 1204). A scale factor L is first defined and is used to define kp as L*k. kp is an auxiliary parameter whose value moves up or down by an amount Up or Dn respectively to permit fractional moves of k without the use of floating-point arithmetic. Finally, Uq is defined and used to move kp up if the output code was zero and k was equal to zero.

An input buffer x is read (box 1206) and contains M numbers. Next, k is set to k0, kp is set to L*k and run is set to 0 (box 1208). The process is started with a value of k that is a good choice for the long-term statistics of the incoming data, e.g. k=2. Starting with the first symbol, xindex=1 (box 1210), symbol is set to x(xindex) and runmax is set to $2^k$ (box 1212).

As an overview of the encoding process, after encoding a source symbol, kp is adjusted based on the emitted output code. If the output code was 0 and k ≠0, kp is incremented by a predefined increment step Up, i.e. set kp=kp+Up. If the output code was 0 and k=0, kp is incremented by a predefined increment step Uq, i.e. set kp=kp+Uq. If the output code started with a 1 (corresponding to a nonzero input), kp is decremented by a predefined decrement step Dn, i.e. set kp=kp−Dn. The value of k for encoding the next input symbol is set to k=⌊kp/⌋ (i.e. truncate kp/L down to the nearest integer.

The algorithm is based in a simple strategy. If a run of zeros is encountered, k is increased to allow for longer sequences of zeros to be captured by a single output bit=0. If a nonzero symbol is encountered, k is reduced to avoid excessively long output codes. The use of the auxiliary parameter kp and the scale factor L above allows adjustment of k in fractional steps without having to use floating-point arithmetic as indicated above. For most of the data tested in the ARLGR encoder, the performance was quite good (encoded rates very close to source entropies), for the following typical choice of parameters: L=4, Up=4, Dn=5, and Uq=2. In some cases, adjustments on these parameters can lead to slightly better performance.

Returning to the description of the flowchart in FIG. 12, following initialization and defining of parameters, k is checked (box 1214) to see if it is equal to zero. If it is, and if symbol is zero, Uq is added to kp (box 1218). A zero is appended to the output buffer (box 1220) and if kp is out of range (above kpmax then it is clipped (box 1222). Next, k is set to the largest integer less than kp/L, the scale factor (box 1224). Xindex is then incremented (box 1226), and if less than M (box 1228) the next symbol is selected (box 1212). If greater than M, the output bit buffer is written to (box 1230) and the process ends (box 1240).

Referring back to decision block 1216, if symbol was not equal to zero, a 1 is appended to the output bit buffer (box 1242) and a sign bit of symbol is appended to the output bit buffer (box 1244), and processing continues (box 1222) to check to see if kp is within range. If k is not equal to 1 (box 1214), a further check of symbol is performed (box 1250). If symbol is not equal to zero, a 1 is appended to the output bit buffer (box 1252) and a k-bit value of run is appended to the output bit buffer (box 1254). Next, Dn is subtracted from kp (box 1256) and processing continues whereby an optional sign bit is appended (box 1244).

If symbol is found to be zero at box 1250, run is incremented (box 1260) and then checked (box 1262) to see if it is equal to runmax. If not, kp is clipped to not exceed kpmax (box 1222). If run was equal to runmax (box 1262), a zero is appended to the output bit buffer (box 1264) and run is set to zero (box 1266). Finally, Up is added to kp, and processing again reverts to block 1222 for clipping of kp, setting of k (box 1224), incrementing xindex (box 1226) and checking to see if the last symbol has been processed (box 1228). If so, the information is written to the output bit buffer (box 1230) and the process is ended (box 1240).

A more detailed description of the techniques described in FIGS. 11 and 12 can be found in the following co-pending U.S. patent applications: (1) Ser. No. 09/276,954, filed on Mar. 26, 1999, entitled "Image Encoding Using Reordering and Blocking of Wavelet Coefficients Combined with Adaptive Encoding" by Henrique Malvar; and (2) Ser. No. 09/277,255, filed on Mar. 26, 1999, entitled "Lossless Adaptive Encoding of Finite Alphabet Data" by Henrique Malvar. The subject matter of both patent applications is hereby incorporated by reference in their entirety.

Figure 13A:
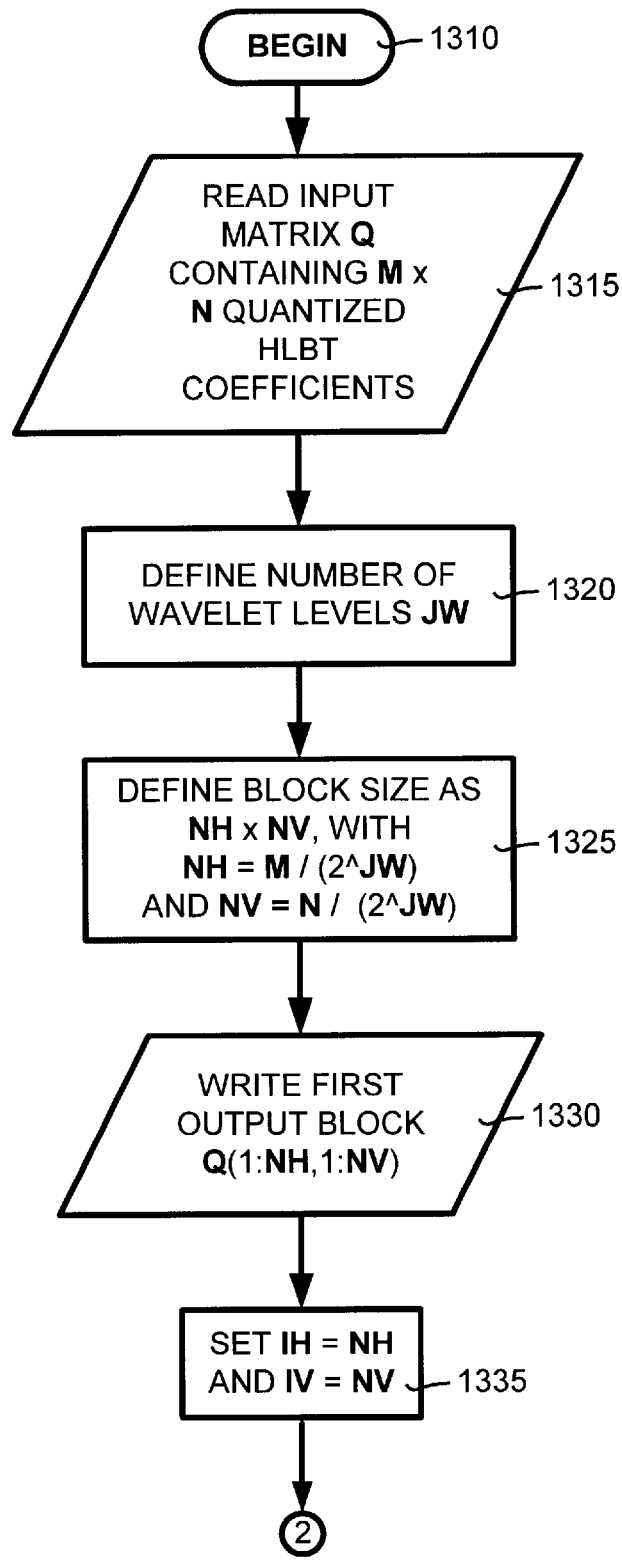
FIG. 13 is a working example represented by a flow chart illustrating the writing of a matrix of coefficients in a reordered manner consistent with that shown in FIG. 10.
Figure 13B:
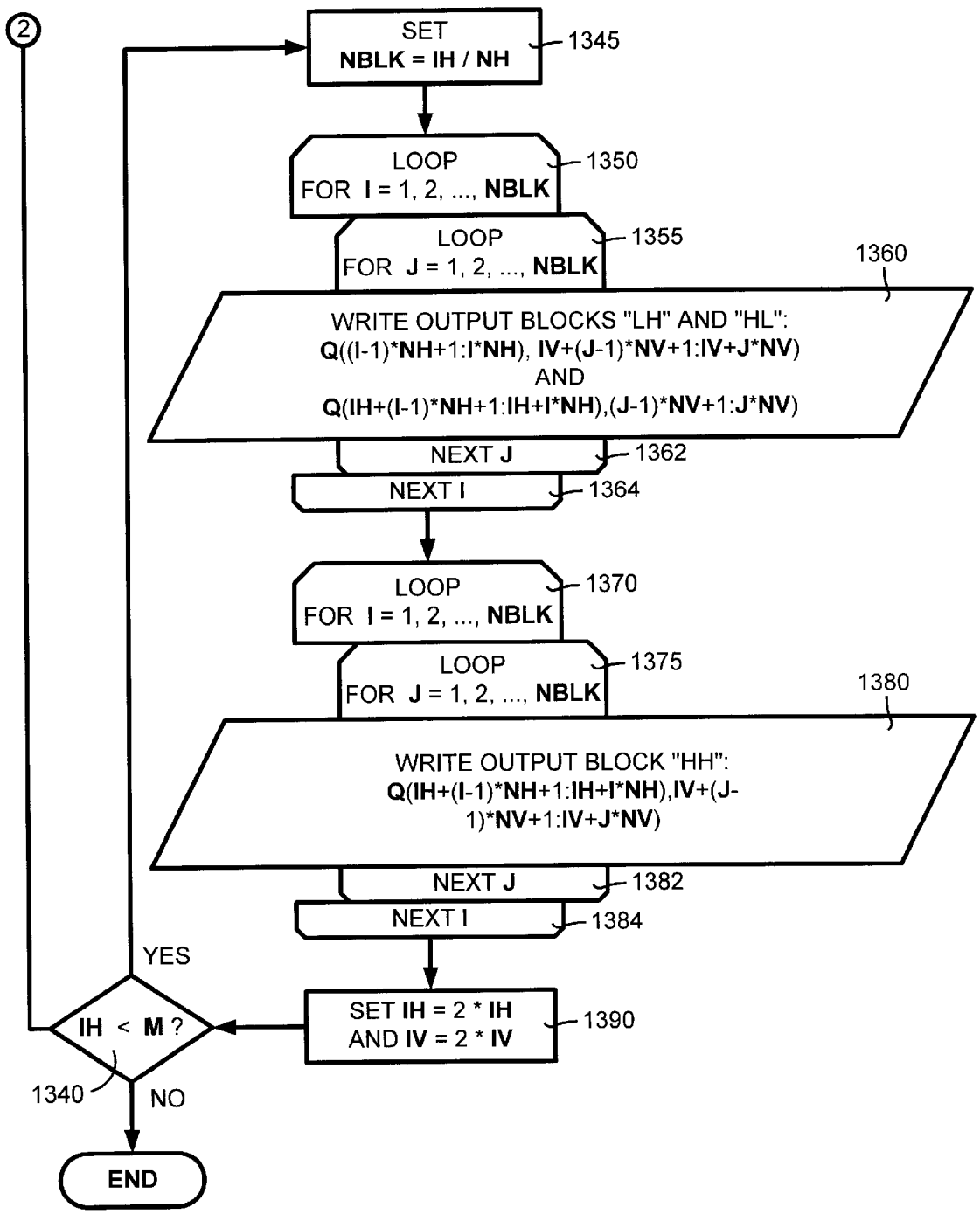

FIG. 13 is a working example represented by a flow chart illustrating the writing of a matrix of coefficients in a reordered manner consistent with the block reordering map shown in FIG. 10. This flowchart in describes an algorithm used to write the blocks of coefficients in the order shown in FIG. 10. The algorithm may be implemented in computer program instructions, or in hardware, firmware or a combination of all as desired.

Referring to FIGS. 10 and 13, the algorithm is entered (box 1310) and an input matrix Q containing M×N quantized HLT coefficients is read (box 1315). A number of HLT levels is defined (box 1320) in a known manner as JW. A block size is defined (box 1325) as NH×NV, with NH equal to $MI(2^{JW})$ and NV equal to $NI(2^{JW})$. The first output block is then written (box 1330) and IH and IV are initialized as NH and NV respectively for use in defining loops for writing of further blocks, which are larger in size. For a simplified example, assume that in FIG. 10, the matrix Q is 16 by 16, with 4 HLT levels, and a block size of 1. This provides an initial IH and IV of 1. In further examples, the block size may be larger, such as 8×8 or 16×16, or even higher. Also, the blocks do not need to be square (i.e. NH may be different from NV. This typically happens when handling input images that are not square).

A decision block (box 1340) is used to determine whether the entire matrix of HLT coefficients has been written by checking to see if IH is less than M. If IH is still less than M, more HLT coefficients need to be written. As seen in FIG. 10, the first blocks of HLT coefficients are of dimension 1 by 1, and then they increase to 2 by 2, 4 by 4 and so forth. The next sets of flowchart blocks are used to write the succeeding blocks by looping from one to a block size parameter NBLK that is set (box 1345) as IH/NH. A nested loop using I (box 1350) and using J (box 1355) is used to control the order of writing of the output blocks LH and HL (box 1360). J is incremented at a first NEXT statement (box 1362), while I is incremented at second NEXT statement (box 1364). This results in rows of the blocks being written first in this particular implementation. Columns may also be written first if desired, or any other order of writing may be used. For the first time through the loop, given a matrix of size 16 by 16 and 4 levels, NBLK is also 1, so only blocks 1030 and 1040 are written.

Following the writing of the next LH and HL blocks, a second set of nested loops is set up again using I (box 1370) and using J (box 1375) to define positions in which to write an output block (box 1380). This output block corresponds to HH blocks at the same level, which is block 1050 for the first time through. A first NEXT statement for J (box 1382 and a second NEXT statement for I (box 1384) complete the nested loop. It should be noted that the HH block could also have been written at the same time as the LH and HL blocks above since the nested loops are identical. After all the blocks at this level have been written6, IH and IV are incremented as exponents of 2 (box 1390) and then compared (box 1340) to see if IH is still less than M. If IH is not less than M, the algorithm is exited (box 1395) after having provided at complete reordered set of HLT coefficients in accordance with the present invention.

The second time through the nested loops, blocks 1055, 1060 and 1070 are written, followed by blocks 1080, 1075 and 1090 the third time through the nested loops. Larger matrix sizes with higher levels are also possible. To recover the original order for decoding purposes, the output of the reordering algorithm is read in the same manner in which it was written. All that is required is knowledge of the size of the original matrix, and the number of levels that were written. Then the writing order is simply reversed to provide the coefficients in the original order. A more detailed description of the techniques described in FIGS. 10 and 13 are discussed in co-pending U.S. patent application Ser. No. 09/280,135, filed on Mar. 26, 1999, entitled "Reordering Wavelet Coefficients for Improved Encoding" by Henrique Malvar, the subject matter of which is hereby incorporated by reference in its entirety.

VII. Real World Implementation

Figure 14:
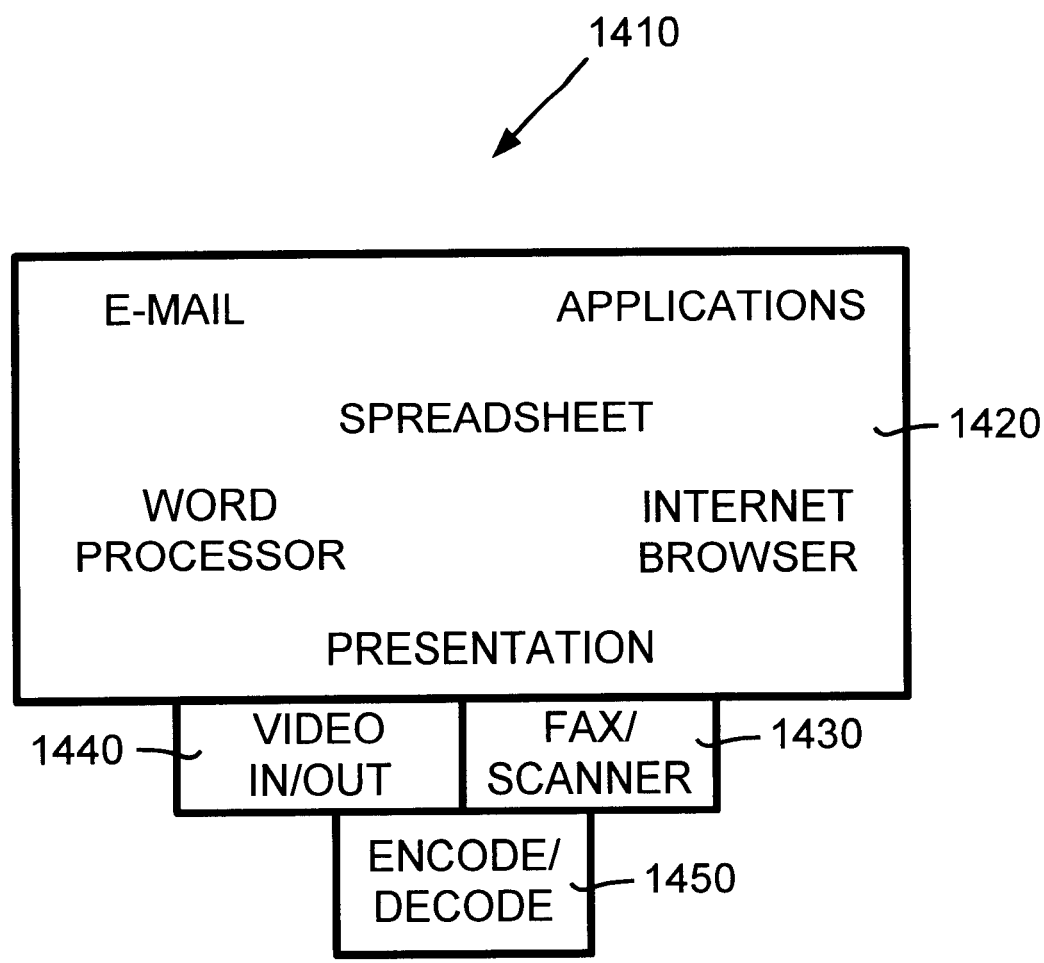
FIG. 14 is a simplified block diagram illustrating a real world implementation of the encoder of FIGS. 3A–3B and the decoder of FIGS. 4A–4B in a software application environment that handles image data.

FIG. 14 is a simplified block diagram illustrating a real world implementation of the encoder of FIGS. 3A–3B and the decoder of FIGS. 4A–4B in a software application environment 1410 that handles image data. In particular, the software application environment 1410 includes a plurality of high-level application environments 1420 such as e-mail, word processing, spreadsheet, internet browser presentation and other types of applications. This application environment level 1420 is supported by at least two lower levels that provide software functions, hardware functions or a combination of both. The two lower level functions include a facsimile/scanner function 1430 and a video input/output function 1440. In addition, several other types of functions may reside at this level.

The video input/output function 1440 provides the ability to display and receive video and image data from external sources. The video input/output function 1440 and the facsimile/scanner function 1430 use the encoder and decoder of the present invention 1450 to provide encoding and decoding functions as described above. If raw image or other suitable data is captured (such as in pixel or other form) the encoder 1450 may be used to encode the data. Moreover, if data encoded using the type of encoding of the present invention is received from any source the decoder 1450 may be called by the high-level application environment 1420 to transform of decode the data into a displayable or usable format.

Many applications that comprise an integrated suite of software applications (such as several software applications that work in conjunction) may need to share files easily with each other and are likely to deal with data that needs to be compressed or decompressed. The present invention provides compression that is free from blocking artifacts (such as those present in JPEG) and is less complex to implement in software, hardware or a combination of both. For example, software or hardware (such as digital cameras, printers and Internet appliances) that are designed to use JPEG compression can more easily implement the present invention. Moreover, the present invention provides single-pass encoding for any desired compression ratio as well as scalability. This means that an image that has been encoded at a certain fidelity may be decoded at a lower fidelity, thereby allowing, for example, a server to distribute different versions of the same encoded image to different clients having different capabilities.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of compressing digital data, comprising:
   generating coefficients using a hierarchical transform; and
   reordering the coefficients by alternate scanning of coefficient blocks from different subbands to group similar data in a data independent manner.

2. The method of claim 1, wherein the hierarchical transform uses a hierarchical lapped biorthogonal transform as a first transform operator.

3. The method of claim 2, further comprising encoding the reordered coefficients.

4. The method of claim 2, wherein the hierarchical lapped biorthogonal transform uses a butterfly operator.

5. The method of claim 4, wherein the butterfly operator includes butterfly coefficients and wherein at least some of the butterfly coefficients are equal to at least one of: (a)+1; (b)−1.

6. The method of claim 4, wherein the hierarchical lapped biorthogonal transform uses an orthogonal operator to control the shape of basis functions.

7. The method of claim 2, wherein the hierarchical transform computes the coefficients using a discrete cosine transform as a second transform operator.

8. The method of claim 7, wherein the discrete cosine transform uses 8×8 blocks.

9. The method of claim 1, further comprising quantizing the coefficients using integers.

10. The method of claim 1, wherein the hierarchical transform uses at least two transform operators.

11. The method of claim 10, wherein the coefficients are generating using a lapped biorthogonal transform followed by a discrete cosine transform.

12. The method of claim 1, wherein the different subbands are a high-low (HL) subband and a corresponding low-high (LH) subband.

13. The method of claim 1, further comprising reordering the coefficients within each of the coefficient blocks in a manner similar to a wavelet decomposition.

14. A method of encoding image data, comprising:
    generating coefficients using a hierarchical lapped biorthogonal transform;
    reordering the coefficients by scanning blocks of the coefficients in an alternating manner between different subbands and within each block reordering the coefficients to favor groupings of similar image data in a data-independent manner; and
    encoding the reordered coefficients.

15. The method of claim 14, wherein the reordered coefficients are encoded using an adaptive run-length Rice-Golomb encoder.

16. The method of claim 15, wherein a maximum run length of the encoder is determined by a recent history of encoded symbols.

17. The method of claim 16, wherein a maximum run length of the encoder is determined by the last encoded symbol.

18. The method of claim 14, wherein the hierarchical lapped biorthogonal transform uses a lapped biorthogonal transform followed by a discrete cosine transform.

19. The method of claim 14, wherein the coefficients are generated without using wavelets.

20. A method of decoding a compressed bitstream, comprising:
extracting coefficients from the compressed bitstream using adaptive run-length decoding;
reordering the extracted coefficients to an original order by alternate scanning of blocks of extracted coefficients from different subbands; and
transforming the coefficients using an inverse hierarchical lapped biorthogonal transform.

21. The method of claim 20, wherein the inverse hierarchical lapped biorthogonal transform uses an inverse discrete cosine transform and an inverse lapped biorthogonal transform.

22. An encoding system for processing a signal, comprising:
a transform processor that receives the signal and generates hierarchical lapped biorthogonal transform coefficients;
a reordering processor that reorders the transform coefficients by alternate scanning of blocks of the transform coefficients from different subbands to group similar data of the signal in a data independent manner; and
a blocking processor that groups transform coefficients within the blocks into clusters of like values that result in a clustering of blocks of frequency coefficients that are most likely to be zero.

23. The encoding system of claim 22, further comprising a coder that adaptively entropy codes the reordered coefficients.

24. The encoding system of claim 23, wherein the coder is an adaptive run-length Rice-Golomb encoder that encodes the signal in a lossless manner.

25. The encoding system of claim 22, wherein the transform processor is a hierarchical transform that includes a lapped biorthogonal transform and a discrete cosine transform.

26. The encoding system of claim 25, wherein the reordering processor ensures that combined coefficients of the lapped biorthogonal transform and the discrete cosine transform represent an appropriate mapping between a spatial domain and a frequency domain enabling the hierarchical lapped transform to represent an approximation to a wavelet transform.

27. The encoding system of claim 22, further comprising a quantizer for quantizing the hierarchical lapped transform.

28. The encoding system of claim 27, wherein the reordering processor is adapted to allow subsequent clustering of insignificant values by the blocking processor after quantization of the hierarchical lapped transform.

29. The encoding system of claim 28, wherein the reordering processor and the blocking processor are an integrated coefficient and block reordering processor.

30. A method for encoding and decoding digital data, comprising the process actions of:

(a) encoding digital data via an encoding process comprising the actions of,
generating coefficients using a hierarchical lapped biorthogonal transform,
reordering the coefficients by alternate scanning of coefficient blocks from different subbands to favor groupings of similar data in a data-independent manner, and
compressing the reordered coefficients using adaptive run-length encoding to form a compressed bitstream; and (b) decoding digital encoded in accordance with process action (a) via a decoding process comprising the action of,
extracting coefficients from the compressed bitstream using adaptive run-length decoding,
reordering the extracted coefficients to their original order, and
transforming the coefficients using an inverse hierarchical lapped biorthogonal lapped transform.

31. A encoding and decoding system for processing digital data, comprising:
(a) an encoder comprising,
a first transform module that generates coefficients from the digital data using a hierarchical lapped biorthogonal transform,
a first recording module that alternately scans blocks of the coefficients from different subbands and groups the coefficients in a data-independent manner to favor groupings of similar data, and
a compression module that compresses the reordered coefficients using adaptive run-length encoding to form a compressed bitstream; and
(b) a decoder for decoding digital data encoded via said encoder, comprising,
an extracting module that extracts coefficients from the compressed bitstream using adaptive run-length decoding,
a second reordering module that reorders the extracted coefficients to mirror their original order, and
a second transform module that transforms the coefficients back into digital data using an inverse hierarchical lapped biorthogonal transform.

32. A method of compressing digital data, comprising:
generating coefficients using hierarchical lapped biorthogonal transforms;
scanning a plurality of blocks of the coefficients within each of the subbands to obtain a first coefficient block within a first subband and a second coefficient block within a second subband;
performing a reordering of coefficients within the first coefficient block and the second coefficient block to approximate a wavelet decomposition; and
encoding the reordered coefficients using an adaptive run-length entropy encoder.

33. The method of claim 32, wherein the first subband is a high-low (HL) subband and the second subband is a corresponding low-high (LH) subband.

34. The method of claim 32, wherein scanning a plurality of blocks of the coefficients within each of the subbands further comprises scanning in row order.

* * * * *